US012322187B1

(12) United States Patent
Boydston et al.

(10) Patent No.: US 12,322,187 B1
(45) Date of Patent: Jun. 3, 2025

(54) PERCEPTION SYSTEM VELOCITY DETERMINATION

(71) Applicant: Zoox, Inc., Foster City, CA (US)

(72) Inventors: Jacob Daniel Boydston, Foster City, CA (US); Giacomo Zavolta Taylor, San Francisco, CA (US); Chuang Wang, Woodside, CA (US)

(73) Assignee: Zoox, Inc., Foster City, CA (US)

( * ) Notice: Subject to any disclaimer, the term of this patent is extended or adjusted under 35 U.S.C. 154(b) by 357 days.

(21) Appl. No.: 17/514,838

(22) Filed: Oct. 29, 2021

Related U.S. Application Data

(63) Continuation-in-part of application No. 17/116,888, filed on Dec. 9, 2020, now Pat. No. 12,060,076.

(51) Int. Cl.
| | |
|---|---|
| *G06V 20/56* | (2022.01) |
| *B60W 50/00* | (2006.01) |
| *B60W 60/00* | (2020.01) |
| *G06F 18/23* | (2023.01) |
| *G06T 7/20* | (2017.01) |

(52) U.S. Cl.
CPC ............ *G06V 20/56* (2022.01); *B60W 50/00* (2013.01); *B60W 60/001* (2020.02); *G06F 18/23* (2023.01); *G06T 7/20* (2013.01); *B60W 2050/0075* (2013.01); *B60W 2420/403* (2013.01); *B60W 2420/408* (2024.01); *G06T 2207/10028* (2013.01); *G06T 2207/20084* (2013.01); *G06T 2207/30252* (2013.01)

(58) Field of Classification Search
CPC ............ B60W 60/001; B60W 2420/52; G01S 13/931; G01S 2013/9325; G06F 18/23; G06F 18/24; G06V 20/56
See application file for complete search history.

(56) References Cited

U.S. PATENT DOCUMENTS

| | | | |
|---|---|---|---|
| 9,014,905 B1 | 4/2015 | Kretzschmar et al. | |
| 2018/0348346 A1* | 12/2018 | Vallespi-Gonzalez | ...................... G01S 7/4802 |
| 2019/0156485 A1* | 5/2019 | Pfeiffer | ................... G06N 20/00 |
| 2019/0340775 A1* | 11/2019 | Lee | ...................... G05D 1/0212 |
| 2019/0354782 A1* | 11/2019 | Kee | ...................... G06F 18/2321 |
| 2020/0307692 A1 | 10/2020 | Senn et al. | |

(Continued)

FOREIGN PATENT DOCUMENTS

CN        112825134        5/2021

OTHER PUBLICATIONS

Office Action for U.S. Appl. No. 17/116,888, mailed on Jun. 30, 2023, Chuang Wang, "Determining Inputs for Perception System", 17 pages.

(Continued)

*Primary Examiner* — Ig T An
(74) *Attorney, Agent, or Firm* — Lee & Hayes, P.C.

(57) ABSTRACT

Techniques for clustering sensor data are discussed herein. Sensors of a vehicle may detect data points in an environment. Clustering techniques can be used in a vehicle safety system to determine connection information between the data points. Further, the machine learned model can be trained to output motion data representing velocity data or a cluster association score. The connection information and/or motion data can be used by a vehicle computing device to detect objects in an environment and/or to control operation of a vehicle.

20 Claims, 11 Drawing Sheets

(56) References Cited

U.S. PATENT DOCUMENTS

2020/0309957 A1* 10/2020 Bhaskaran .............. G01S 17/86
2022/0176988 A1 6/2022 Wang et al.

OTHER PUBLICATIONS

Office Action for U.S. Appl. No. 17/116,888, mailed on Sep. 13, 2023, Chuang Wang, "Determining Inputs for Perception System", 16 pages.
Office Action for U.S. Appl. No. 17/116,888, mailed on Dec. 29, 2023, Chuang Wang, "Determining Inputs for Perception System", 18 pages.
The International Search Report and Written Opinion for PCT Application No. PCT/US21/60658, mailed Mar. 10, 2022. 9 pages.
Office Action for U.S. Appl. No. 17/116,888, mailed on Mar. 3, 2023, Wang, "Determining Inputs for Perception System", 16 Pages.

* cited by examiner

PERCEPTION SYSTEM VELOCITY DETERMINATION

CROSS REFERENCE TO RELATED APPLICATION

This patent application is a continuation-in-part of U.S. patent application Ser. No. 17/116,888, filed Dec. 9, 2020. Application Ser. No. 17/116,888 is hereby incorporated by reference, in its entirety.

BACKGROUND

Planning systems in autonomous and semi-autonomous vehicles determine actions for a vehicle to take in an operating environment. Actions for a vehicle may be determined based in part on avoiding objects present in the environment. For example, an action may be generated by a planning system to yield to a pedestrian, to change a lane to avoid another vehicle in the road, or the like. Perception systems utilize sensor data from sensors to "see" the environment which enables the planning systems to determine an effect of a detected object on a potential action for the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
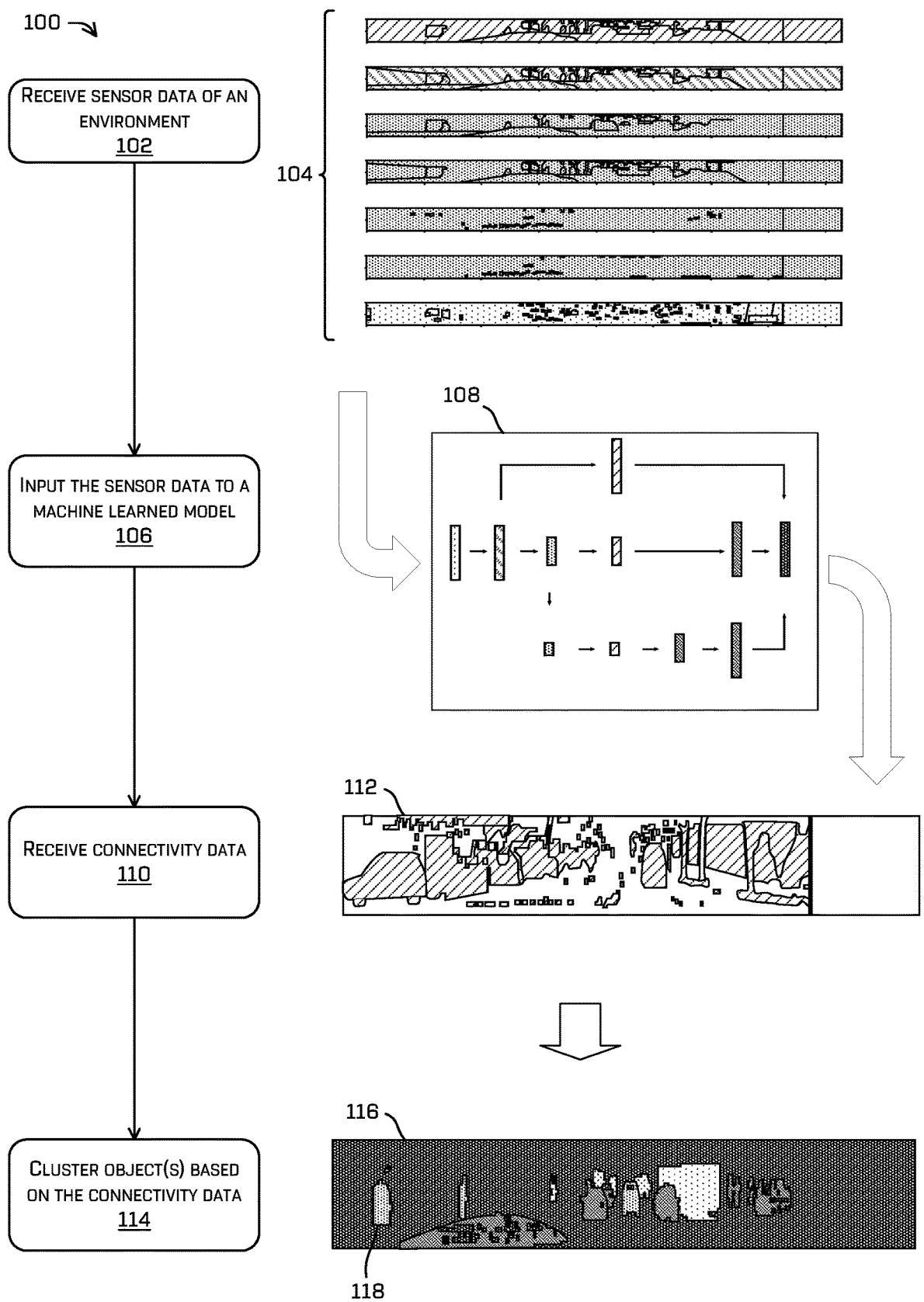
FIG. 1 is a pictorial flow diagram of an example process of clustering sensor data.

Techniques for clustering sensor data are discussed herein. Such clustering techniques can be used in a vehicle safety system that detects objects in an environment and validates and/or controls operation of a vehicle, such as an autonomous vehicle. For instance, a machine learned model can receive sensor data from one or more sensors as input and implement a clustering algorithm to output connectivity data indicating whether data points in an environment of the vehicle are connected (e.g., whether a lidar point is connected to a neighboring lidar point). The connectivity data output by the machine learned model can be sent to a vehicle computing device that performs clustering and/or segmenting techniques to detect objects in the environment. Using the techniques described herein, a vehicle may receive connectivity information from a model usable by the vehicle to quickly and/or preemptively avoid objects, thereby improving safety of the vehicle.

Generally, the model may provide functionality to cluster or group data points represented by the sensor data. By way of example and not limitation, connectivity data output by the model can be used by another model that implements segmentation techniques to limit under segmentation and/or over segmentation associated with an object. A same or different model may also or instead implement clustering techniques based on the connectivity data to identify or determine which group of connected data points in the environment are associated with a same object (e.g., differentiate between exhaust smoke and a vehicle, a truck and a delivery ramp extending from the truck, and so on). In some examples, a model may identify whether a data point is associated with a boundary of an object or if the data point is inside the boundary of the object.

In various examples, the model can receive input data from a machine learned model that selects or otherwise determines the input data based at least in part on computational resources associated with the model. For instance, the machine learned model can select a subset of available data as input data that maximizes efficiency and/or accuracy of a point clustering algorithm implemented by the model. By receiving input data from a machine learned model, the model can be "tuned" to efficiently make use of available computational resources while also improving accuracy of predictions. Further discussion of determining input data is discussed throughout this disclosure including in FIG. 2.

In some examples, a model (e.g., a first model) that determines connectivity data based on the input data may be a machine learned model implementing a single convolutional neural network layer. For instance, the first model may implement a relatively simple neural network relative to a neural network implemented by a second model that determines the input data. This is possible, in part, because of the amount and/or type of input data determined by the second model. Thus, the first model that determines the connectivity data can be implemented by a vehicle safety system that typically avoids using machine learning techniques (e.g., due to computational and/or safety-based constraints). By implementing techniques that include the second model selecting inputs and/or parameters for the first model, a vehicle safety system can determine connectivity data with improved speed and accuracy relative to not using both models. However, in other examples, the first model may determine some or all of the input data based at least in part on sensor data, historical data, map data, and the like. Additional details of implementing a machine learned model to determine connectivity data is discussed throughout this disclosure including in FIG. 3.

The techniques discussed herein may include capturing or receiving sensor data of environment, such as lidar data from a lidar sensor. To reduce an amount of data for processing, the techniques can include associating the lidar data with a two-dimensional data representation. The two-dimensional data representation (also referred to as a two-dimensional representation or a 2D space) may associate lidar data points with one or more of: an intensity, a range, an elevation, an azimuth angle, and/or coordinates (e.g., polar and/or Cartesian coordinates), just to name a few. In some examples, a machine learned model can select, as input data, a combination of two or more of intensity data, range data, elevation data, azimuth angle data, and/or coordinate data for associating with the 2D representation (or multiple, respective 2D representations).

In some examples, the model can apply one or more clustering algorithms to determine connectivity data representing a connection between two or more data points of the lidar data. For instance, a point clustering algorithm may be implemented by the model to determine whether a first lidar point is associated with a second lidar point. The connectivity data may be associated with one or more two-dimensional data representations such as the example connectivity data discussed in relation to FIG. 4 and elsewhere.

An output from a model implemented by the vehicle safety system can be used to control a vehicle in the environment. For example, connectivity data output by a model may be sent to a vehicle computing device that can detect an object and use the connectivity data to control an action of the vehicle, such as determining a trajectory for the vehicle or otherwise causing the vehicle to traverse the environment. For instance, controlling the vehicle may comprise stopping the vehicle and/or controlling at least one of: a braking system, an acceleration system, or a drive system of the vehicle.

The vehicle safety system may also or instead implement a model to determine, based at least in part on data clustering of the connectivity data, object data representing an object in the environment. Object clustering techniques used by a model may include determining a distance between a first data point of the lidar data and a second data point of the lidar data or determining a direction of the first data point relative to the second data point. In such examples, the model may determine the object data based at least in part on the distance and/or the direction associated with the data points. In some examples, the object data may represent an edge of the object, semantic information associated with the object, or a combination thereof. For instance, during object clustering of the connectivity data, a data point may be associated with an edge or boundary of an object (e.g., the closest data point of a pedestrian to the sensor). To avoid a collision with the object, a same or different model of a vehicle computing device can determine whether a potential intersection point and/or intersection time between the vehicle and the edge of the object. In such examples, the vehicle computing device can control operation of the vehicle based at least in part on the object data and/or the determination of the potential intersection point(s) and/or times(s).

In some examples, the connectivity data can comprise a classification probability indicating a likelihood of a connection between a first data point of the two-dimensional data representation relative to a second data point of the two-dimensional data representation. In such examples, the a model can compare the classification probability to a threshold, and a) determine that the first data point and the second data point are connected based at least in part on the classification probability meeting or exceeding the threshold, or b) determine that the first data point and the second data point are not connected based at least in part on the classification probability being below the threshold. In various examples, object clustering of the connectivity data can be based at least in part on the classification probability meeting or exceeding the threshold.

As described above, in some examples, techniques for predicting connectivity information between data points of an environment as described herein can be implemented as part of a vehicle safety system running on a resource constrained platform (e.g., processor and/or memory capacity is limited). In such examples, the model can perform multiple separate operations that are relatively easy to calculate (e.g., determining if a point in the environment is associated with another point or not, determining if a point in the environment is an inside point of an object or an edge point of the object, etc.) and limit computations to a finite amount of input data. In this way, the model can output connectivity data that acts to validate detections or determinations from a more computationally intensive computing device. This resource savings means that more processing resources can be devoted to additional objects in the environment that may interfere with the vehicle. The disclosed techniques can also be used to support human inspection of the models used which may not be possible in more complex, especially machine-learned, models. The human inspection can be used to verify the system from a safety perspective.

In some examples, the vehicle may comprise an autonomous or semi-autonomous vehicle with a vehicle computing device configured to receive sensor data from one or more sensors of the vehicle. The vehicle may detect objects using one or more sensors while navigating in the environment. The objects may include static objects (e.g., ground level, buildings, bridges, signs, etc.) and dynamic objects such as other vehicles (e.g., cars, trucks, motorcycles, mopeds, etc.), pedestrians, bicyclists, or the like. In some examples, the objects may be detected based on sensor data from sensors (e.g., cameras, motion detectors, lidar sensors, radar sensors, etc.) of the vehicle. As yet another example, the objects may be detected based on sensor data received from remote sensors, such as, for example, sensors associated with another vehicle or sensors situated in the environment that are configured to share data with a plurality of vehicles. Sensor data representing the detected objects may be used to determine input data usable by the model to predict an edge of the object and/or semantic information associated with the object (e.g., an identification, an object type, an object shape, etc.).

In some examples, the vehicle may comprise a vehicle safety system implemented separately from the vehicle computing device for improved performance of the vehicle safety system, and/or to provide redundancy, error checking, and/or validation of determinations and/or commands determined by the vehicle computing device. However, in other examples, the vehicle safety system may be implemented as one or more components within the same vehicle computing device. Additional examples of a vehicle architecture comprising a primary computing system and a secondary computing system can be found, for example, in U.S. patent application Ser. No. 16/218,182 titled "Collision Avoidance System with Trajectory Validation" filed Dec. 12, 2018, U.S. patent application Ser. No. 16/218,182 titled "Collision Avoidance System" filed Dec. 26, 2018, and U.S. patent application Ser. No. 16/588,529 titled "Collision Avoidance Perception System" filed Sep. 30, 2019, the entirety of which are herein incorporated by reference.

By way of example, the vehicle computing device may be considered to be a primary system, while the vehicle safety system may be considered to be a secondary system. The primary system may generally perform processing to control how the vehicle maneuvers within an environment. The primary system may implement various artificial intelligence (AI) techniques, such as machine learning, to understand an environment around the vehicle and/or instruct the vehicle to move within the environment. For example, the primary system may implement the AI techniques to localize the vehicle, detect objects around the vehicle, segment sensor data, determine classifications of the objects, predict object tracks, generate trajectories for the vehicle and the objects around the vehicle, and so on.

In some examples, the vehicle safety system may operate as a separate system that receives input data (e.g., perception data) based on the sensor data and AI techniques implemented by the primary system (e.g., vehicle computing device), and may perform various techniques described herein for improving collision prediction and avoidance by the vehicle.

In some examples, the techniques for predicting connectivity between data points can include applying and/or training a model to predict if a point in the environment is associated with or connected to a neighboring data point. In some complex environments, it may be difficult to distinguish between data points that a boundary of an object (e.g., another vehicle) relative to another object (e.g., exhaust, steam, leaves, ground level, and so on). Using the techniques described herein, a vehicle safety system can classify, cluster, otherwise determine whether data points in the environment are associated with a boundary (e.g., one or more of a left edge, a right edge, an upper edge, or a lower edge, etc.) of another vehicle, steam, leaves, rain, and/or ground level, just to name a few.

By way of example and not limitation, to enable the vehicle to respond quickly and accurately to objects, the model may send connectivity information (e.g., connectivity data) to a planning component configured to plan a trajectory for the vehicle and/or to a perception component configured to sense the environment. In this way, connection information from the model can be considered during planning operations (e.g., to avoid the object) and/or during perception operations (e.g., to direct one or more sensors to capture a different level of perception for an object).

A vehicle computing device may allocate an amount of memory, a type of memory, and/or a memory location to make the best use of available memory resources to models that predict possible connections between data points. In some examples, models may make use of memory resources that are remote from the vehicle (e.g., a remote server or a remote vehicle).

In some examples, a model may define processing resources (e.g., processor amount, processor cycles, processor cores, processor location, processor type, and the like) to use to predict connectivity data and/or whether an object associated with the connectivity data will intersect with the vehicle. A vehicle computing device that implements a model may have different processors (e.g., Central Processing Units (CPUs), Graphics Processing Units (GPUs), multicore processor, and the like). Models may define processing resources to utilize a processor that most efficiently (e.g., uses the least amount of computational time) outputs a prediction. In some examples, models may predict intersection values by processing the object using a GPU, CPU, or a combination thereof. In this way, each model may be defined to utilize the processing resources that enable the model to perform predictions in the least amount of time (e.g., to use the connection values in planning considerations of the vehicle). Accordingly, a model may receive input data from another model to make the best use of available processing resources and enable more predictions that may improve how a vehicle navigates in relation to the objects.

As described herein, models may be representative of machine learned models, statistical models, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein can improve a functioning of a computing device of a vehicle in a number of ways. For example, the model may act as an attention system (e.g., a vehicle safety system and/or a redundancy to an existing perception component) that provides connection information to identify and/or detect objects in an environment. The techniques can include the model optimizing available computational resources by performing operations that limit the impact on the available resources (as compared to not implementing the model). Utilizing connectivity data by a vehicle computing device, for instance, can improve the accuracy and/or reduce a latency for the vehicle to respond to a potential collision in the environment.

The techniques described herein can be implemented in a number of ways. Example implementations are provided below with reference to the following figures. Although discussed in the context of an autonomous vehicle, the methods, apparatuses, and systems described herein can be applied to a variety of systems and is not limited to autonomous vehicles. In another example, the techniques can be utilized in an aviation or nautical context, or in any system using sensor data. Further, although discussed in the context of lidar data, the techniques can be applicable to any type of sensor data are not limited to specific examples discussed herein. Additionally, the techniques described herein can be used with real data (e.g., captured using sensor(s)), simulated data (e.g., generated by a simulator), or any combination of the two.

FIG. 1 is a pictorial flow diagram of an example process 100 of clustering sensor data. The example process 100 may be implemented by a vehicle computing device, such as the first computing device(s) 604 and/or the second computing device(s) 618 of FIG. 6.

An operation 102 can include receiving sensor data of an environment. For example, the operation 102 can include receiving lidar data representing an environment 104. In some examples, the operation 102 can include receiving sensor data from a plurality of sensors (e.g., multiple lidar sensors) and fusing or otherwise combining the data into a single point cloud (e.g., a calibrated and aligned dataset). In some examples, the operation 102 can be performed by an autonomous vehicle as it traverses the environment 104.

An operation 106 can include inputting the sensor data into a machine learned model. For instance, the machine learned model 108 of a vehicle safety system can determine connections between data points in the environment based on the input data. In various examples, the operation 106 can include the machine learned model 108 receiving the input data from another machine learned model that determines the input data based on the sensor data, historical data, map data, and the like. With respect to the input data, the operation 106 can include determining a two-dimensional representation of the environment 104 based on the sensor data (e.g., lidar data, etc.), and associating different aspects of the sensor data (e.g., range, intensity, azimuth angle, coordinates, and the like) with the two-dimensional representation.

An operation 110 can include receiving connectivity data from a machine learned model 108. For example, the operation 110 can include receiving connectivity data 112 indicating a connection among data points in the two-dimensional representation(s). In various examples, the connectivity data can comprise a classification probability indicating a likelihood of a connection between a first data point of the two-dimensional data representation relative to a second data point of the two-dimensional data representation. In some examples, the operation 110 can include grouping or clustering data points using a point clustering algorithm during processing of the input data.

An operation 114 can include clustering object(s) based at least in part on the connectivity data 112 output from the machine learned model 108. For example, the operation 114 can include determining or detecting one or more objects in the environment based on the connections between the data points indicated by the connectivity data 112. In some examples, a same or different machine learned model may be employed to identify an object (or object data) associated with connected datapoints. The operation 114 can include, in various examples, outputting a two-dimensional representation 116 that indicates which data points in the environment are associated with an object 118. In some examples, a model can determine object data associated with the object based at least in part on a distance and/or a direction between the data points associated with the object. In some examples, the operation 114 can include clustering objects by applying an algorithm(s) to the connectivity data to identify which data points are within a distance threshold and/or a direction threshold relative to one another. Additional examples of clustering objects are discussed throughout this disclosure.

In some examples, objects detected, identified, validated, or otherwise determined based on the connectivity data can be used by a vehicle computing device to control the vehicle (e.g., determine an action to avoid the objects in the environment). In this way, a vehicle may receive connectivity information from a model usable by the vehicle to quickly and/or preemptively avoid objects, thereby improving safety of the vehicle.

In various examples, the model may provide an output representing connectivity information based at least in part on different types of input data. To illustrate, consider the following non-limiting example in which a vehicle navigates an environment and detects data points representing potential objects in the environment. In such an example, the machine learned model 108 may receive input data representing intensity data, range data, azimuth angle data, polar coordinates, and/or Cartesian coordinates associated with the data points, and output connectivity data 112 indicating connections between different data points. The connectivity data 112 output by the machine learned model 108 is usable, in some examples, to cluster objects (e.g., determine which data points belong to a particular object). For instance, a model implemented by a vehicle computing device can receive the connectivity data and determine the data points belonging to an object, such as a pedestrian, another vehicle, and so on. Additionally or alternatively, the model may determine one or more edges of the pedestrian that represent an outer most point of the object (and therefore closest to the vehicle). In various examples, the vehicle computing device can determine, based at least in part on the one or more determined edges of the pedestrian, a probability that an edge of the pedestrian and a portion of the vehicle intersect.

Figure 2:
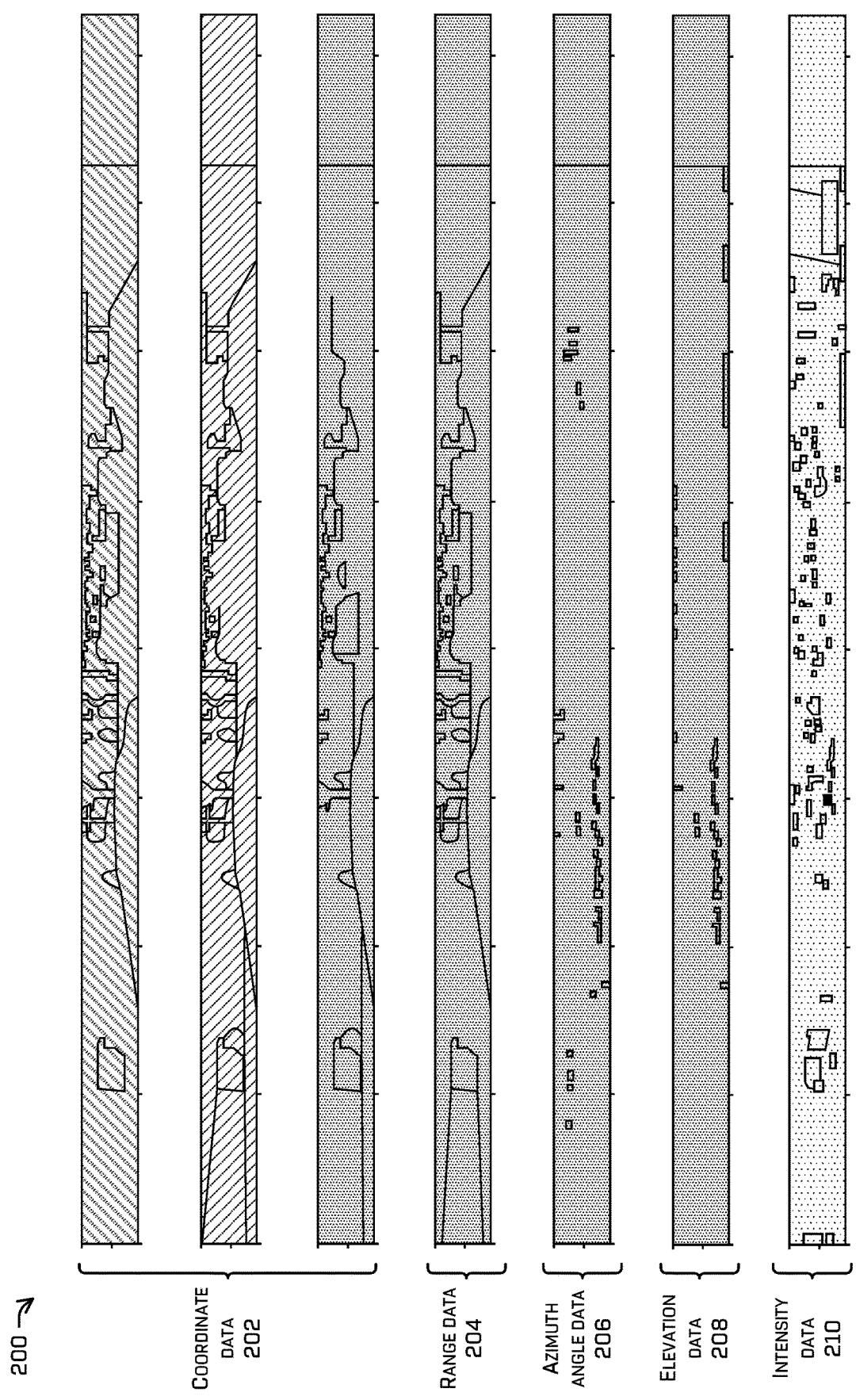
FIG. 2 is an illustration of example input data for a model implementing the clustering techniques described herein.

FIG. 2 is an illustration of example input data 200 for a model implementing the clustering techniques described herein. In some examples, the input data 200 is associated with a machine learned model implemented by a vehicle safety system (e.g., the machine learned model 108) that clusters data points in the environment. In various examples, the input data 200 may be determined by a different machine learned model dedicated to identifying input data that results in efficient and accurate connectivity determinations when used by the machine learned model (relative to not implementing the different machine learned model).

As depicted in FIG. 2, the input data 200 can comprise coordinate data 202, range data 204, azimuth angle data 206, elevation data 208, and intensity data 210. However, other types of input data are contemplated as discussed herein.

FIG. 2 depicts the input data 200 comprising multiple different two-dimensional representations of an example environment for each input data type. For example, as part of "pre-processing" the sensor data for use as input data, a model of a vehicle safety system may associate sensor data (or portions thereof) with two-dimensional representations to achieve a desired input data size for more efficient processing. The two-dimensional data representation (also referred to as a two-dimensional representation or a 2D space) may associate data points in the environment with one or more types of input data. In various examples, a machine learned model can determine the input data 200 based at least in part on down sampling and/or up sampling portions of the sensor data to achieve a desired resolution or data size for the input data 200. For example, lidar data, radar data, or other types of data included as part of the sensor data may be modified for use as input data (e.g., reduced in size and/or resolution) into a model that determines connectivity data between the data points represented in the input data.

In some examples, the input data 200 can be associated with sensor data from one or more sensors (e.g., a lidar sensor, a radar sensor, a camera, etc.). In some examples, the sensor data can be captured from one or more sensors associated with a vehicle and/or one or more autonomous vehicles in a fleet. In some examples, the one or more sensors comprises one or more lidar sensors. Lidar sensors can capture lidar data (and associated lidar data points) in various ways. For example, a rotating lidar may include scanning 360 degrees of an environment. Generally, dimensions of the 2D space may be discretized into bins corresponding to each type of input data including azimuth angle bins, elevation bins, intensity bins, and so on, which may comprise 5 degrees, 8 degrees, 10 degrees, 18 degrees, 36 degrees, and the like. Additional dimensions of the 2D space may be discretized into beam indices, such as 32, 64, 100, 128, etc. individual beam indices (also referred to as channels).

FIG. 2 shows example coordinate data 202 as three two-dimensional representations of the environment which can comprise polar coordinates (e.g., a distance or an angle of the data point is determined relative to a reference point, such as the vehicle) and/or Cartesian coordinates (e.g., x, y, z, etc.). The range data 204 can represent line of sight distance from the sensor to data points in the environment. The azimuth angle data 206 can represent azimuth angles for data points in the environment relative to a sensor of the vehicle. The elevation data 208 can represent elevation of data points relative to the vehicle or another data point. The elevation data 208 can also or instead represent a difference in elevation between two or more data points relative to the vehicle. The intensity data 210, meanwhile, can represent an intensity of a data point relative to another data point in the environment.

Other input data 200 (not shown) comprises one or more of: polar coordinates, Euclidian coordinates, an average elevation angle relative to the vehicle, a difference in a three dimensional Euclidean distance between the two or more data points, a difference in a radial distance between the two or more data points, a difference in intensity between the two or more data points, a difference in azimuth angle between the two or more data points relative to the vehicle, a difference in elevation between the two or more data points relative to the vehicle, a heading a data point, or a planar angle of data points.

In some examples, the input data 200 can comprise data point information (e.g., a distance from the vehicle, an azimuth angle relative to the vehicle, intensity, coordinate values, velocity, and so on), vehicle information (e.g., a planned trajectory of the vehicle, position, orientation, steering wheel angle, and so on), environmental information (e.g., weather conditions, elevation, and the like), and/or parameter information (e.g., one or more parameters associated with an algorithm to be implemented by the model).

In various examples, the input data 200 may comprise some but not all of the coordinate data 202, the range data 204, the azimuth angle data 206, the elevation data 208, and the intensity data 210. By way of example and not limitation, the input data 200 can comprise the azimuth angle data 206 and the elevation data 208 which may optionally be associated with a two-dimensional representation for input into a model. In some examples, the two-dimensional representation comprising the input data can be associated with any one or more examples or types of input data described herein.

Figure 3:
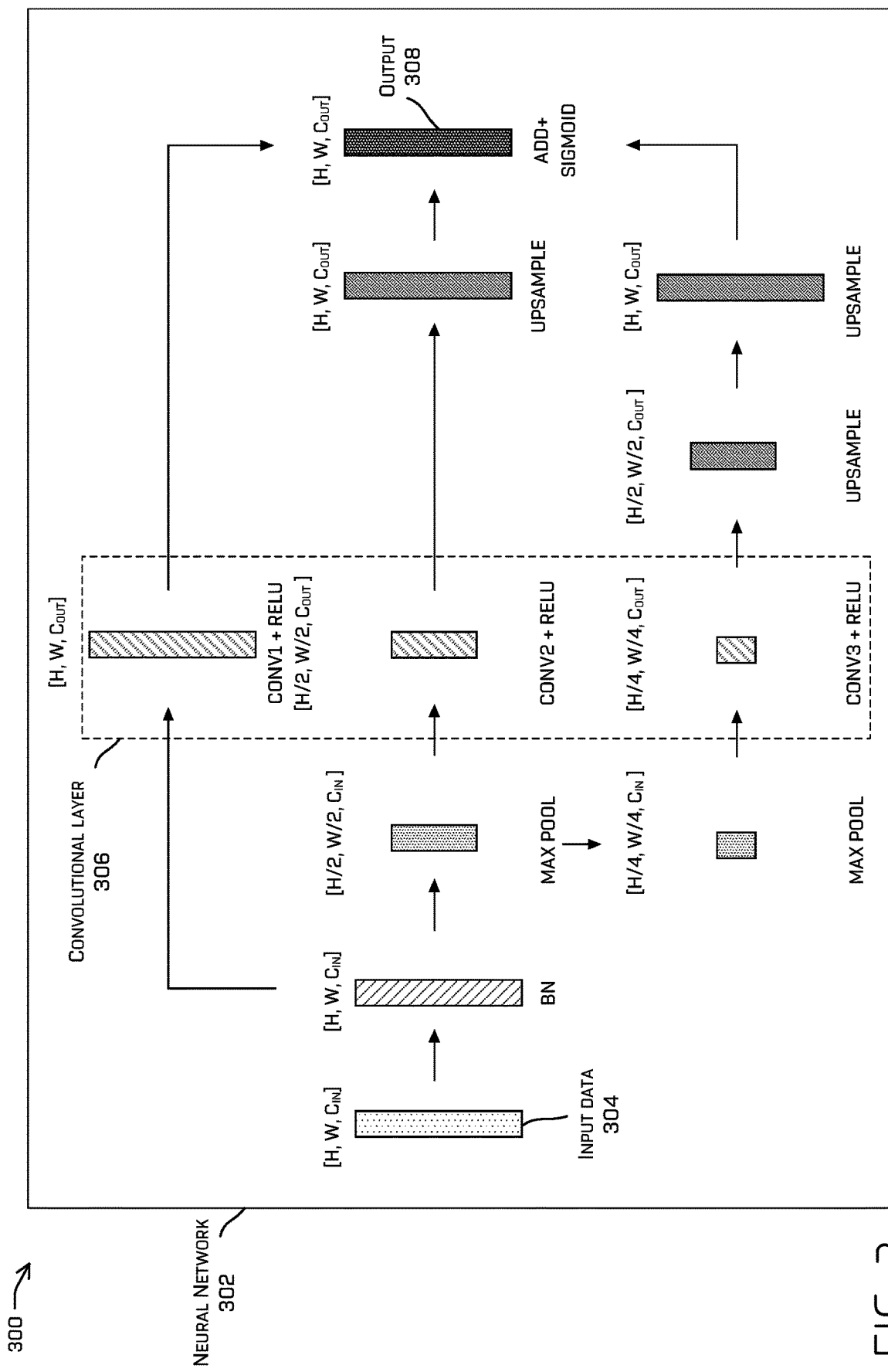
FIG. 3 is an illustration of an example machine learned model to determine connectivity data between data points in an environment.

FIG. 3 is an illustration of an example machine learned model to determine connectivity data between data points in an environment. For instance, a machine learned model of a vehicle safety system can implement a neural network 302 that receives input data 304 (e.g., the input data 200), processes the input data 304 through at least one convolutional layer 306, and determines an output 308 indicating connection information between data points in the environment.

Generally, a neural network (e.g., an artificial neural network) may be trained to perform one or more tasks. Such training includes forward propagation and backwards propagation. During forward propagation (also referred to as a forward pass), data may be input into the artificial neural network to compute activations at layers within the artificial neural network, and ultimately, an output. Each layer may be associated with one or more operations (or nodes) and each operation may be associated with a weight. During backwards propagation (also referred to as a backwards pass or backpropagation), an error representing a difference between the output and a desired output (e.g., a ground truth) may be propagated backwards through the layers of the artificial neural network to adjust the weights (e.g., using gradient descent). The backwards propagation may include executing one or more gradient functions associated with the one or more operations of the forward propagation to generate one or more gradient values.

A training component of a vehicle computing device may be executed by a processor to train the neural network 302 (also referred to as "the neural network") based on training data. The training data may include a wide variety of data, such as image data, video data, lidar data, radar data, audio data, other sensor data, etc., that is associated with a value (e.g., a desired classification, inference, prediction, etc.). Such values may generally be referred to as a "ground truth." To illustrate, the training data may be used for clustering data and, as such, may include an image of an environment that is captured by an autonomous vehicle and that is associated with one or more classifications or determinations. In some examples, such a classification may be based on user input (e.g., user input indicating that the image depicts a specific type of connection) or may be based on the output of another machine learned model. In some examples, such labeled classifications (or more generally, the labeled output associated with training data) may be referred to as ground truth.

In some examples, the convolutional layer 306 can comprise a single layer. For instance, a single convolutional layer may be employed to help ensure verifiability of the neural network 302. In some examples, the convolutional layer 306 can comprise additional branches usable in parallel (e.g., CONV1, CONV2, and CONV3 depicted in FIG. 3) and represent a single layer of "depth". In some examples, a first branch of the convolutional layer 306 can be associated with a first downsampling rate (or level), and a second branch of the convolutional layer 306 can be associated with a second downsampling rate (or level) different from the first downsampling rate. For instance, a first branch (e.g., CONV1) and a second branch (e.g., CONV2) of the convolution layer 306 may receive data as input that has been downsampled at different rates for processing by the respective branch. In some examples, branches of the convolutional layer 306 can be associated with different upsampling and/or downsampling rates depending on the implementation.

Though the example neural network 302 of FIG. 3 depicts a plurality of hidden layers such as a batch normalization layer, a max pool layer, an up sample layer, and a sigmoid activation layer, in other examples, the neural network 302 may comprise other numbers or types of hidden layers. In one specific example, the neural network 302 can include a down sample layer instead of or in addition to the up sample layer. In some examples, the order of the hidden layers can be arranged differently (e.g., the up sampling layer and/or a down sample layer can occur before the convolutional layer 306).

FIG. 3 further depicts parameters in brackets for portions of the neural network 302. In some examples, the parameters "[H, W, $C_{in}$]" associated with the batch normalization layer (and other parameters) can be determined by a machine learned model trained to identify parameters that optimize the efficiency of the neural network 302. In various examples, parameter data (e.g., optimization parameters associated with an algorithm) determined by the machine learned model may be included as part of the input data 304. In such examples, the accuracy of a prediction and/or efficiency of using computational resources by the neural network 302 can be improved by receiving the parameter data versus, for example, employing a human (or using other techniques) to select the parameters. In some examples, the neural network 302 can determine or otherwise train the parameters without a second model, such as a separate machine learned model.

Figure 4:
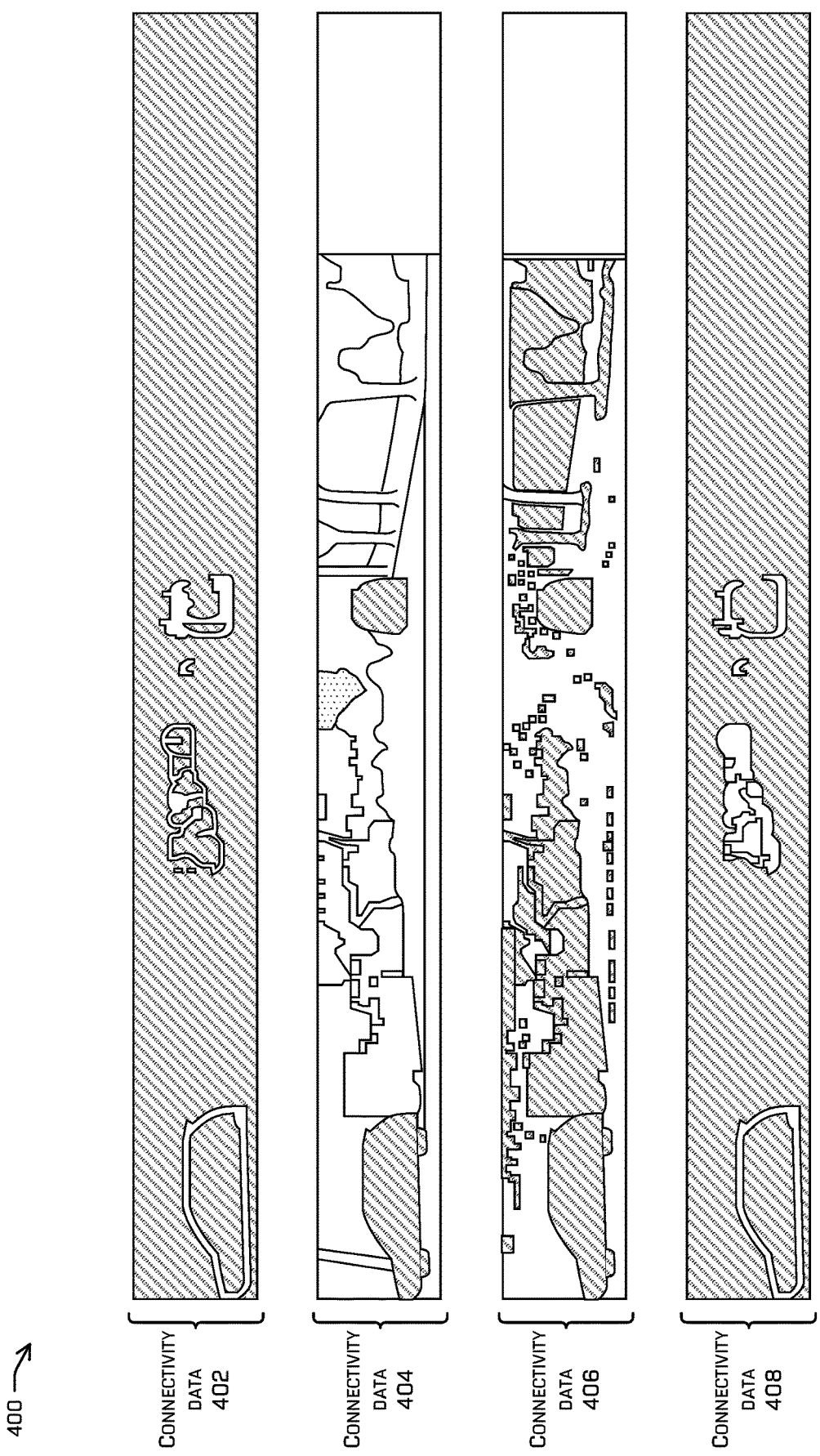
FIG. 4 is an illustration of an example implementation, in which one or more models determine connectivity data between data points in an environment.

FIG. 4 is an illustration of an example implementation, in which one or more models determine connectivity data between data points in an environment. For instance, a vehicle computing device of a vehicle can implement a model (e.g., the machine learned model 108) to determine connectivity data 402, connectivity data 404, connectivity data 406, and connectivity data 408 (referred collectively as "connectivity data"). Each of the connectivity data 402, the connectivity data 404, the connectivity data 406, and the connectivity data 408 can comprise a two-dimensional representation output by the model as a result of processing input data (e.g., the input data 200).

The two-dimensional representation of the connectivity data shown in FIG. 4 comprises data points having different shading to indicate connection information between the data points. In some examples, a model can employ a point clustering algorithm to determine whether a data point is connected or not connected to another data point (e.g., a neighboring data point). In some examples, a model can determine a probability (e.g., a likelihood) of a connection between two data points (e.g., lidar data points), and output connectivity data based at least in part on the probability meeting or exceeding a connection threshold.

The connectivity data output by the model can be used in a variety of ways. For instance, the connectivity data can be communicated to another model or component of a vehicle computing device for validating commands determined by the vehicle computing device. In some examples, and as discussed in FIG. 5 and elsewhere, a vehicle computing device can use the connectivity data to improve detections of objects proximate a vehicle.

Figure 5:
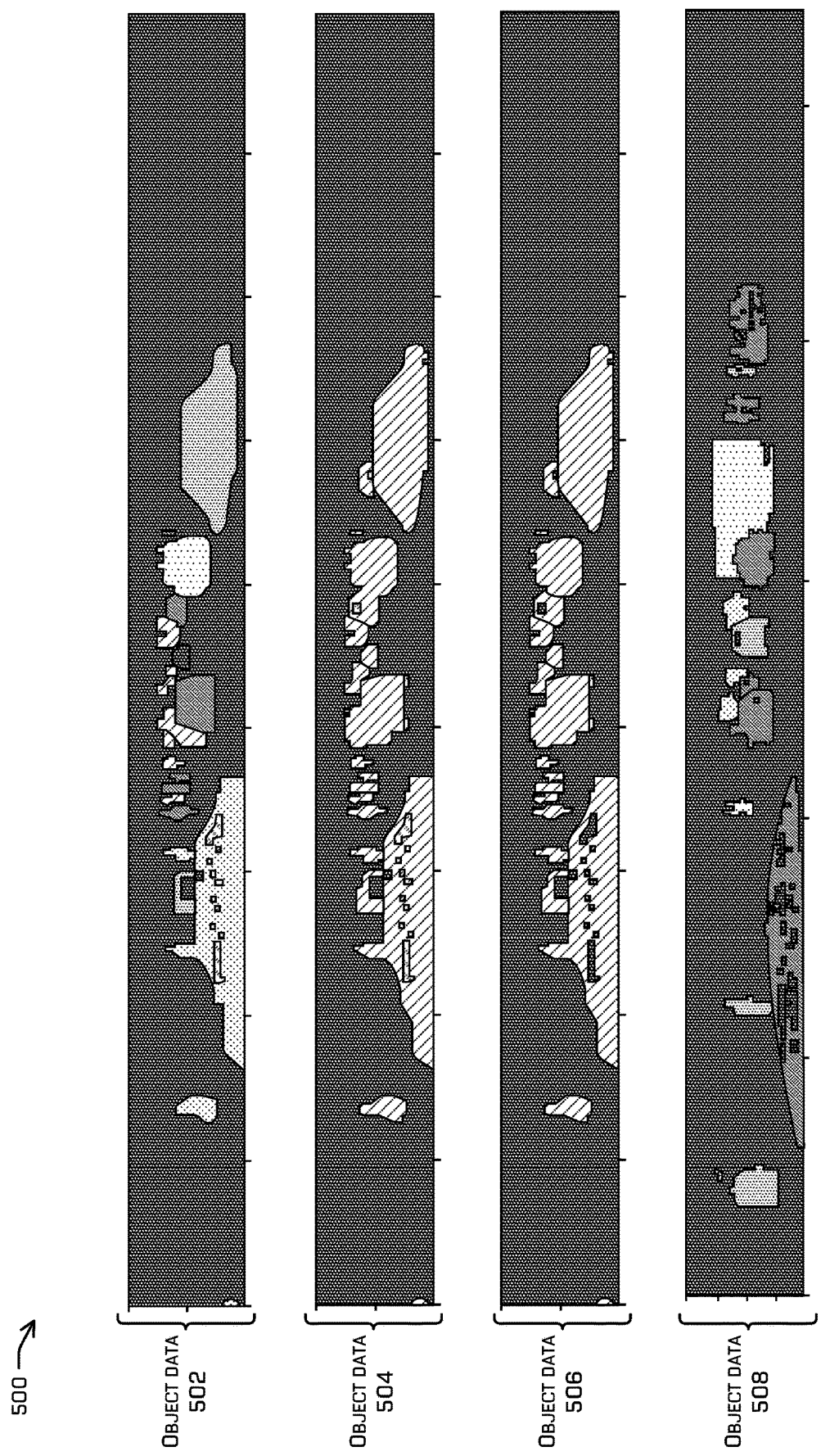
FIG. 5 is an illustration of an exemplary implementation for clustering objects based on connectivity data output from one or more models.

FIG. 5 is an illustration of an exemplary implementation for clustering objects based on connectivity data output from one or more models. For instance, a vehicle safety system may implement a model to determine, based at least in part on data clustering of the connectivity data, object data 502, object data 504, object data 506, and object data 508 representing an object in the environment.

In various examples, object clustering techniques used by a model may include determining a distance between a first data point of the connectivity data and a second data point of the connectivity data. The connectivity data may represent lidar data, radar, data, or other types of sensor data. In some examples, the model may determine a direction of a first data point relative to a second data point. In some examples, the model may determine the object data based at least in part on the distance and/or the direction associated with the first data point and the second data point.

In some examples, the model can compare, as a distance comparison, the distance associated with the data points to a distance threshold and/or compare, as a direction comparison, the direction associated with the data points to a direction threshold. In such examples, the model can determine the object data based at least in part on the distance comparison and/or the direction comparison.

In some examples, the model can determine, based at least in part on the connectivity data, object data comprising an object type, an object shape, or an object presence of an object in an environment. In some examples, the model may receive a planned trajectory for the vehicle, and verify, based at least in part on the object type, the object shape, and/or or the object presence, a potential intersection between the planned trajectory for the vehicle and the object. For instance, the model can receive the connectivity data as input along with the planned trajectory of the vehicle and features of the object such as object velocity data and object heading data (e.g., from a prediction component of a vehicle computing device) for determining a potential intersection point and a potential intersection time between the vehicle and the object in the future. Accordingly, the connectivity data may be taken into account in operations (e.g., simulations, estimated states, interaction modeling, collision estimation, etc.) or other vehicle control planning operation.

Figure 6:
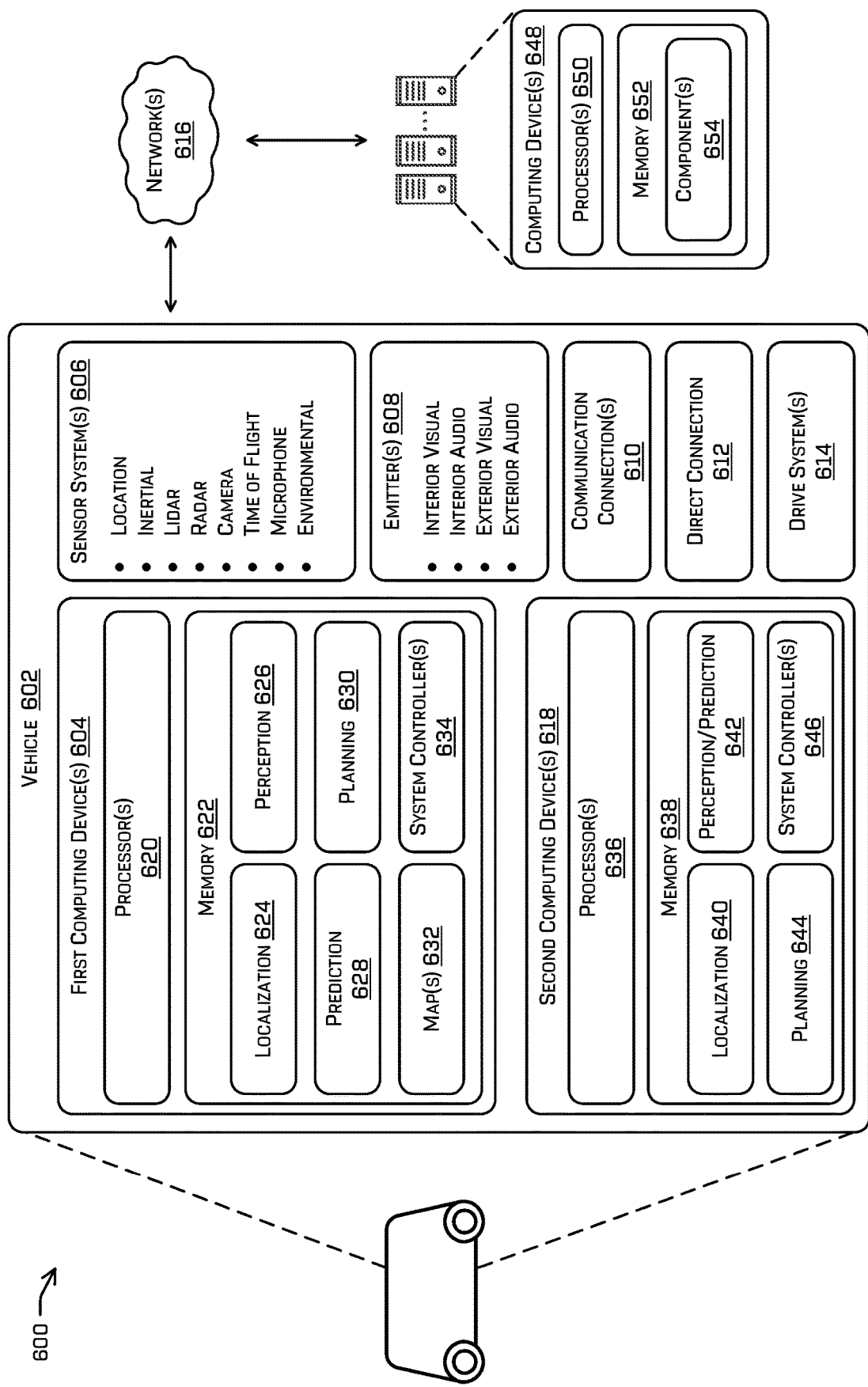
FIG. 6 is a block diagram of an example system for implementing the techniques described herein.

FIG. 6 is a block diagram of an example system 600 for implementing the techniques described herein. In at least one example, the system 600 can include a vehicle 602. In the illustrated example system 600, the vehicle 602 is an autonomous vehicle; however, the vehicle 602 can be any other type of vehicle.

The vehicle 602 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 can be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 602 can include one or more first computing devices 604, one or more sensor systems 606, one or more emitters 608, one or more communication connections 610 (also referred to as communication devices and/or modems), at least one direct connection 612 (e.g., for physically coupling with the vehicle 602 to exchange data and/or to provide power), and one or more drive systems 614. The one or more sensor systems 606 can be configured to capture sensor data associated with an environment.

The sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple instances of each of these or other types of sensors. For instance, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the first computing device(s) 604.

The vehicle 602 can also include emitter(s) 608 for emitting light and/or sound. The emitter(s) 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include communication connection(s) 610 that enable communication between the vehicle 602 and one or more other local or remote computing device(s) (e.g., a remote teleoperation computing device) or remote services. For instance, the communication connection(s) 610 can facilitate communication with other local computing device(s) on the vehicle 602 and/or the drive system(s) 614. Also, the communication connection(s) 610 can allow the vehicle 602 to communicate with other nearby computing device(s) (e.g., other nearby vehicles, traffic signals, etc.).

The communications connection(s) 610 can include physical and/or logical interfaces for connecting the first computing device(s) 604 to another computing device or one or more external networks 616 (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 602 can include drive system(s) 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include the sensor system(s) 606 to detect conditions of the drive system(s) 614 and/or the surroundings of the vehicle 602. By way of example and not limitation, the sensor system(s) 606 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) 606 on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) 606 and to control operation of the various vehicle systems. In some examples, the drive system controller can include one or more processor(s) and memory communicatively coupled with the one or more processor(s). The memory can store one or more components to perform various functionalities of the drive system(s) 614. Furthermore, the drive system(s) 614 also include one or more communication connection(s) that enable communication by the respective drive system with one or more other local or remote computing device(s).

The vehicle 602 can include one or more second computing devices 618 to provide redundancy, error checking, and/or validation of determinations and/or commands determined by the first computing device(s) 604.

By way of example, the first computing device(s) 604 may be considered to be a primary system, while the second computing device(s) 618 may be considered to be a secondary system. The primary system may generally perform processing to control how the vehicle maneuvers within an environment. The primary system may implement various Artificial Intelligence (AI) techniques, such as machine learning, to understand an environment around the vehicle and/or instruct the vehicle to move within the environment. For example, the primary system may implement the AI techniques to localize the vehicle, detect an object around the vehicle, segment sensor data, determine a classification of the object, predict an object track, generate a trajectory for the vehicle, and so on. In examples, the primary system processes data from multiple types of sensors on the vehicle, such as light detection and ranging (lidar) sensors, radar sensors, image sensors, depth sensors (time of flight, structured light, etc.), and the like.

The secondary system may validate an operation of the primary system and may take over control of the vehicle from the primary system when there is a problem with the primary system. The secondary system may implement probabilistic techniques that are based on positioning, velocity, acceleration, etc. of the vehicle and/or objects around the vehicle. For example, the secondary system may implement one or more probabilistic techniques to independently localize the vehicle (e.g., to a local environment), detect an object around the vehicle, segment sensor data, identify a classification of the object, predict an object track, generate a trajectory for the vehicle, and so on. In examples, the secondary system processes data from a few sensors, such as a subset of sensor data that is processed by the primary system. To illustrate, the primary system may process lidar data, radar data, image data, depth data, etc., while the secondary system may process just lidar data and/or radar data (and/or time of flight data). In other examples, however, the secondary system may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference.

The first computing device(s) 604 can include one or more processors 620 and memory 622 communicatively coupled with the one or more processors 620. In the illustrated example, the memory 622 of the first computing device(s) 604 stores a localization component 624, a perception component 626, a prediction component 628, a planning component 630, a maps component 632, and one or more system controllers 634. Though depicted as residing in the memory 622 for illustrative purposes, it is contemplated that the localization component 624, the perception component 626, the prediction component 628, the planning component 630, the maps component 632, and the one or more system controllers 634 can additionally, or alternatively, be accessible to the first computing device(s) 604 (e.g., stored in a different component of vehicle 602 and/or be accessible to the vehicle 602 (e.g., stored remotely).

In memory 622 of the first computing device 604, the localization component 624 can include functionality to receive data from the sensor system(s) 606 to determine a position of the vehicle 602. For example, the localization component 624 can include and/or request/receive a three-dimensional map of an environment (and/or a map based on semantic objects) and can continuously determine a location of the autonomous vehicle within the map. In some instances, the localization component 624 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 624 can provide data to various components of the vehicle 602 to determine an initial position of an autonomous vehicle for generating a trajectory, as discussed herein.

The perception component 626 can include functionality to perform object detection, segmentation, and/or classification. In some examples, the perception component 626 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional or alternative examples, the perception component 626 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 626 can use perception algorithms to determine a perception-based bounding box associated with an object in the environment based on sensor data. For example, the perception component 626 can receive image data and classify the image data to determine that an object is represented in the image data. Then, using detection algorithms, the perception component 626 can generate a two-dimensional bounding box and/or a perception-based three-dimensional bounding box associated with the object. The perception component 626 can further generate a three-dimensional bounding box associated with the object. As discussed above, the three-dimensional bounding box can provide additional information such as a location, orientation, pose, and/or size (e.g., length, width, height, etc.) associated with the object.

The perception component 626 can include functionality to store perception data generated by the perception component 626. In some instances, the perception component 626 can determine a track corresponding to an object that has been classified as an object type. For purposes of illustration only, the perception component 626, using sensor system(s) 606 can capture one or more images of an environment. The sensor system(s) 606 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle 602. Fused perception data can include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 628 can generate one or more probability maps representing prediction probabilities of possible locations of one or more objects in an environment. For example, the prediction component 628 can generate one or more probability maps for vehicles, pedestrians, animals, and the like within a threshold distance from the vehicle 602. In some instances, the prediction component 628 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 630 can determine a path for the vehicle 602 to follow to traverse through an environment. For example, the planning component 630 can determine various routes and paths and various levels of detail. In some instances, the planning component 630 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 630 can generate an instruction for guiding the autonomous vehicle along at least a portion of the route from the first location to the second location. In at least one example, the planning component 630 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 630 can alternatively, or additionally, use data from the perception component 626 and/or the prediction component 628 to determine a path for the vehicle 602 to follow to traverse through an environment. For example, the planning component 630 can receive data from the perception component 626 and/or the prediction component 628 regarding objects associated with an environment. Using this data, the planning component 630 can determine a route to travel from a first location (e.g., a current location) to a second location (e.g., a target location) to avoid objects in an environment. In at least some examples, such a planning component 630 may determine there is no such collision free path and, in turn, provide a path which brings vehicle 602 to a safe stop avoiding all collisions and/or otherwise mitigating damage.

The memory 622 can further include one or more maps 632 that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 632 can include at least one map (e.g., images and/or a mesh). In some examples, the vehicle 602 can be controlled based at least in part on the map(s) 632. That is, the map(s) 632 can be used in connection with the localization component 624, the perception component 626, the prediction component 628, and/or the planning component 630 to determine a location of the vehicle 602, identify objects in an environment, generate prediction probabilit(ies) associated with objects and/or the vehicle 602, and/or generate routes and/or trajectories to navigate within an environment.

In some examples, the one or more maps 632 can be stored on a remote computing device(s) (such as the computing device(s) 648) accessible via network(s) 616. In some examples, multiple maps 632 can be stored based on, for example, a characteristic (e.g., type of entity, time of day, day of week, season of the year, etc.). Storing multiple maps 632 can have similar memory requirements but can increase the speed at which data in a map can be accessed.

In at least one example, the first computing device(s) 604 can include one or more system controller(s) 634, which can be configured to control steering, propulsion, braking, safety, emitters, communication, and other systems of the vehicle 602. These system controller(s) 634 can communicate with and/or control corresponding systems of the drive system(s) 614 and/or other components of the vehicle 602, which may be configured to operate in accordance with a path provided from the planning component 630.

The second computing device(s) 618 can comprise one or more processors 636 and memory 638 including components to verify and/or control aspects of the vehicle 602, as discussed herein. In at least one instance, the one or more processors 636 can be similar to the processor(s) 620 and the memory 638 can be similar to the memory 622. However, in some examples, the processor(s) 636 and the memory 638 may comprise different hardware than the processor(s) 620 and the memory 622 for additional redundancy.

In some examples, the memory 638 can comprise a localization component 640, a perception/prediction component 642, a planning component 644, and one or more system controllers 646.

In some examples, the localization component 640 may receive sensor data from the sensor(s) 606 to determine one or more of a position and/or orientation (together a pose) of the autonomous vehicle 602. Here, the position and/or orientation may be relative to point(s) and/or object(s) in an environment in which the autonomous vehicle 602 is located. In examples, the orientation may include an indication of a yaw, roll, and/or pitch of the autonomous vehicle 602 relative to a reference plane and/or relative to point(s) and/or object(s). In examples, the localization component 640 may perform less processing than the localization component 624 of the first computing device(s) 604 (e.g., higher-level localization). For instance, the localization component 640 may not determine a pose of the autonomous vehicle 602 relative to a map, but merely determine a pose of the autonomous vehicle 602 relative to objects and/or surfaces that are detected around the autonomous vehicle 602 (e.g., a local position and not a global position). Such a position and/or orientation may be determined, for example, using probabilistic filtering techniques, such as, for example, Bayesian filters (Kalman filters, extended Kalman filters, unscented Kalman filters, etc.) using some or all of the sensor data.

In some examples, the perception/prediction component 642 can include functionality to detect, identify, classify, and/or track object(s) represented in sensor data. For example, the perception/prediction component 642 can perform the clustering operations and operations to estimate or determine connectivity data associated with data points, as discussed herein.

In some examples, the perception/prediction component 642 may comprise an M-estimator, but may lack an object classifier such as, for example, a neural network, decision tree, and/or the like for classifying objects. In additional or alternate examples, the perception/prediction component 642 may comprise an ML model of any type, configured to disambiguate classifications of objects. By contrast, the perception component 626 may comprise a pipeline of hardware and/or software components, which may comprise one or more machine-learning models, Bayesian filters (e.g., Kalman filters), graphics processing unit(s) (GPU(s)), and/or the like. In some examples, the perception data determined by the perception/prediction component 642 (and/or 626) may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

The perception/prediction component 642 may also process the input data to determine one or more predicted trajectories for an object. For example, based on a current position of an object and a velocity of the object over a period of a few seconds, the perception/prediction component 642 may predict a path that the object will move over the next few seconds. In some examples, such a predicted path may comprise using linear assumptions of motion given a position, orientation, velocity, and/or orientation. In other examples, such predicted paths may comprise more complex analyses.

In some examples, the planning component 644 can include functionality to receive a trajectory from the planning component 630 to validate that the trajectory is free of collisions and/or is within safety margins. In some examples, the planning component 644 can generate a safe stop trajectory (e.g., a trajectory to stop the vehicle 602 with a "comfortable" deacceleration (e.g., less than maximum deceleration)) and in some examples the planning component 644 can generate an emergency stop trajectory (e.g., maximum deceleration with or without steering inputs).

In some examples, the system controller(s) 646 can include functionality to control safety critical components (e.g., steering, braking, motors, etc.) of the vehicle. In this manner, the second computing device(s) 618 can provide redundancy and/or an additional hardware and software layer for vehicle safety.

The vehicle 602 can connect to computing device(s) 648 via the network 616 and can include one or more processors 650 and memory 652 communicatively coupled with the one or more processors 650. In at least one instance, the one or more processors 650 can be similar to the processor(s) 620 and the memory 652 can be similar to the memory 622. In the illustrated example, the memory 652 of the computing device(s) 648 stores a component(s) 654, which may correspond to any of the components discussed herein.

The processor(s) 620, 636, and/or 650 can be any suitable processor capable of executing instructions to process data and perform operations as described herein. By way of example and not limitation, the processor(s) 620, 636, and/or 650 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 622, 638, and/or 652 are examples of non-transitory computer-readable media. The memory 622, 638, and/or 652 can store an operating system and one or more software applications, instructions, programs, and/or data to implement the methods described herein and the functions attributed to the various systems. In various implementations, the memory 622, 638, and/or 652 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 622, 638, and/or 652 can be implemented as a neural network. In some examples, the components in the memory 622, 638, and/or 652 may not include machine learning algorithm to reduce complexity and to be verified and/or certified from a safety standpoint.

As described herein, an exemplary neural network is an algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 7:
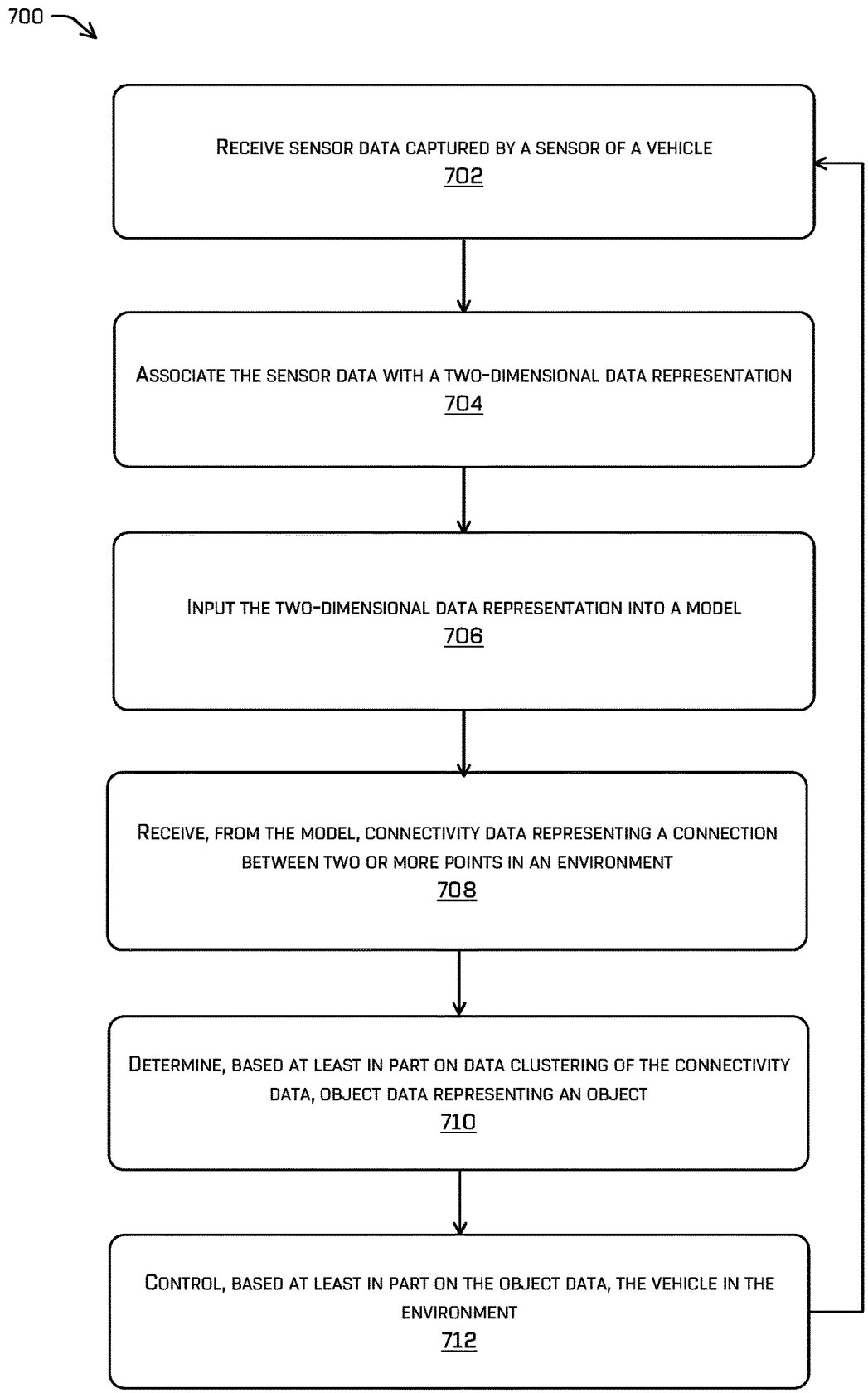
FIG. 7 is a flowchart depicting an example process for determining connectivity data using one or more example models.

FIG. 7 is a flowchart depicting an example process 700 for determining connectivity data using one or more example models. For example, some or all of the process 700 can be performed by one or more components in FIG. 6, as described herein. For example, some or all of the process 700 can be performed by the second computing device(s) 618.

At operation 702, the process may include receiving sensor data captured by a sensor of a vehicle. In some examples, the operation 702 may include a vehicle computing device capturing sensor data from a lidar sensor, a radar sensor, and so on, of the vehicle 602. In some examples, the sensor data comprises data points of the environment, such as lidar data points. The sensor data may be received from one or more sensors on the vehicle and/or from one or more remote sensors.

At operation 704, the process may include associating the sensor data with a two-dimensional data representation. In some examples, the operation 704 may include a vehicle computing device inferring, estimating, or otherwise determining two-dimensional data representations of the environment based at least in part on the sensor data. In various examples, portions of the sensor data (e.g., the coordinate data 202, the range data 204, the azimuth angle data 206, and the like) can be associated with different two-dimension representations for use as input data (e.g., the input data 200).

At operation 706, the process may include inputting the two-dimensional data representation(s) into a model. In some examples, the operation 706 may include the neural network 302 receiving the input data 304 comprising one or more two-dimensional data representations. In various examples, the input data can comprise one or more of: intensity data for a data point, range data for the data point, azimuth angle data relative to the vehicle, elevation data for the data point, polar coordinates for the two or more points in the environment, Euclidian coordinates for the two or more points in the environment, Cartesian coordinates for the two or more points in the environment, an average elevation angle relative to the vehicle, a difference in a three dimensional Euclidean distance between two or more data points of the lidar data, a difference in a radial distance between the two or more data points of the lidar data, a difference in intensity between a first data point and a second data point, a difference in azimuth angle between the first data point and the second data point relative to the vehicle, a difference in elevation between the first data point and the second data point relative to the vehicle, a heading of a data point relative to another data point, or a planar angle of three or more data points.

At operation 708, the process may include receiving, from the model, connectivity data representing a connection between two or more points in an environment. In some examples, the operation 708 may include the neural network 302 outputting connectivity data 402, 404, 406, and/or 408 for use by the vehicle computing device.

At operation 710, the process may include determining, based at least in part on data clustering of the connectivity data, object data representing an object. In some examples, the operation 710 may include a vehicle safety system implementing a model to determine, based at least in part on data clustering of the connectivity data, object data representing an object in the environment. Object clustering techniques used by a model may include determining a distance between a first data point of the lidar data and a second data point of the lidar data or determining a direction of the first data point relative to the second data point. In such examples, the model may determine the object data based at least in part on the distance and/or the direction associated with the data points. In some examples, the object data may represent an edge of the object, semantic information associated with the object, or a combination thereof.

At operation 712, the process may include controlling, based at least in part on the object data, the vehicle in the environment. In some examples, the operation 712 may include controlling the vehicle 602 based on connectivity data from the neural network 302. For instance, the connectivity data may be used by a perception component (e.g., perception component 626) and/or a planning component (e.g., planning component 630 and/or 644). In some examples, the operation 712 may include determining a trajectory of the vehicle 602 based on the object data 502, 504, 506, 508, and/or 510. The vehicle 602 may be controlled to move according to (e.g., follow) the trajectory.

Figure 8:
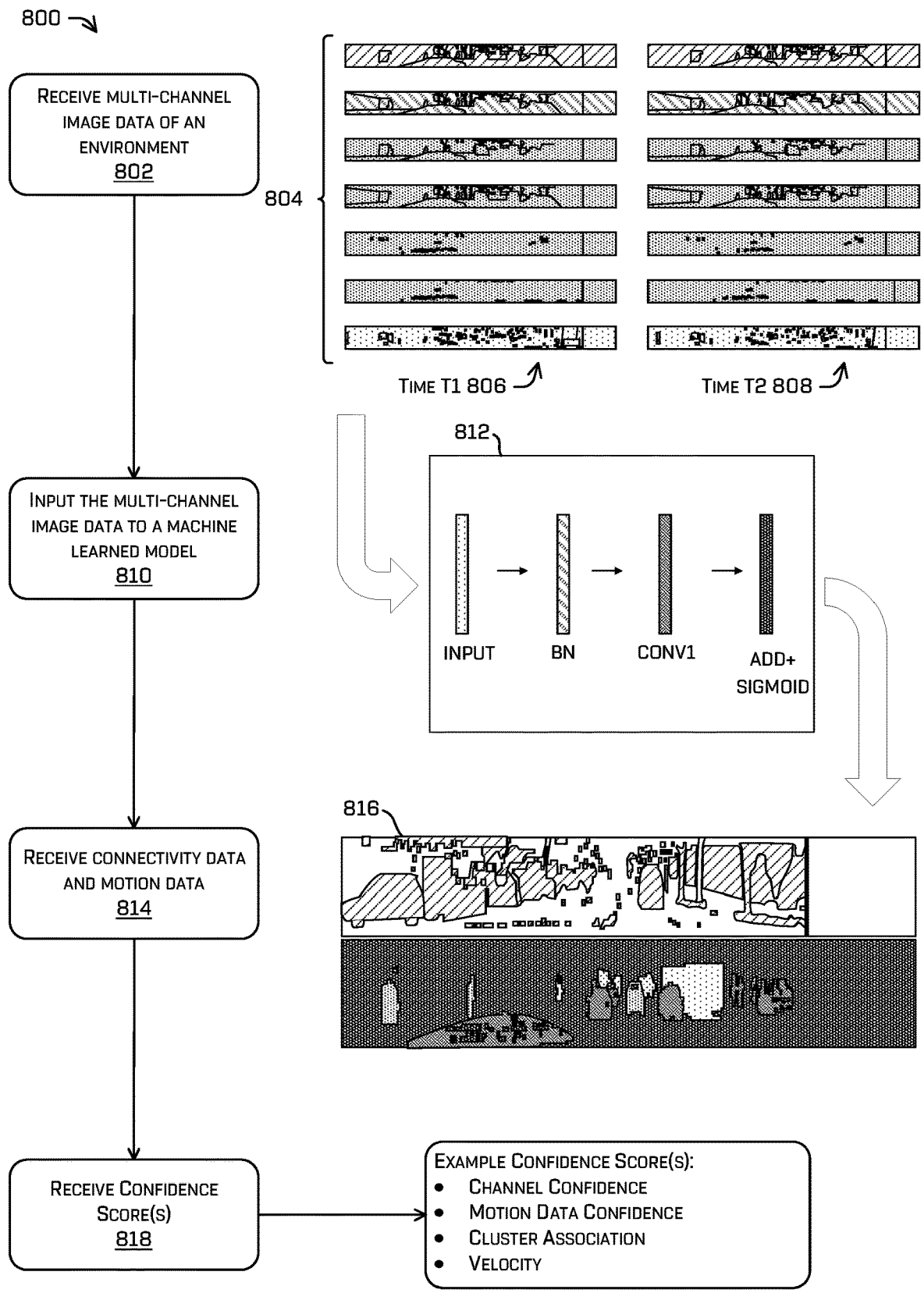
FIG. 8 is a pictorial flow diagram of an example process of outputting connectivity data representing an object and motion data associated with the object.

FIG. 8 is a pictorial flow diagram of an example process of outputting connectivity data representing an object and motion data associated with the object. The example process 800 may be implemented by a vehicle computing device, such as the first computing device(s) 604 and/or the second computing device(s) 618 of FIG. 6.

An operation 802 can include receiving multi-channel image data of an environment. For example, the operation 802 can include receiving sensor data (e.g., lidar data radar data, image data, depth data, or time of flight data) representing the environment (e.g., the environment 104). In some examples, the operation 802 can include receiving sensor data from a plurality of sensors (e.g., multiple lidar sensors) and fusing or otherwise combining the data into a single point cloud (e.g., a calibrated and aligned dataset). In some examples, the operation 802 can be performed by an autonomous vehicle as it traverses the environment 104. The sensor data can be "pre-processed" for use as input data to a machine learned model. A same or different machine learned model can determine the input data based at least in part on down sampling and/or up sampling portions of the sensor data to achieve a desired resolution.

Generally, multi-channel image data comprises two or more channels and each channel encodes a different category of information which can be processed separate from another channel using one or more image processing techniques. In some examples, a channel can be represented by color, intensity, etc. In some examples, channels can be segregated into different images for later processing.

By way of example and not limitation, the model can receive input data 804 representing first multi-channel image data associated with a first time 806 and second multi-channel image data associated with a second time 808 usable to determine whether one or more objects are present in an environment of the vehicle, and if an object(s) is present, also determine a velocity or other motion information for the object(s). The first multi-channel image data and the second multi-channel image data can represent lidar data captured by one or more lidar sensors at different times. The model can cluster lidar data points and clusters for the different times can be compared one to another to identify a change in a position of the lidar data point over time. In such examples, the model can determine a velocity of a lidar data point and/or a velocity of an object associated with the lidar data point.

An operation 810 can include inputting the multi-channel image data into a machine learned model 812. For instance, the machine learned model of a vehicle safety system can receive multiple image frames that represent different times. In various examples, the operation 810 can include the machine learned model 812 receiving the input data from another machine learned model that determines the input data based on the sensor data, historical data, map data, and the like. With respect to the input data, the operation 810 can include determining a two-dimensional representation or a three-dimensional representation of the environment based on the sensor data (e.g., lidar data, etc.), and associating different aspects of the sensor data (e.g., range, intensity, azimuth angle, coordinates, and the like) with the two-dimensional representation or the three-dimensional representation.

An operation 814 can include receiving connectivity data and motion data 816 from a machine learned model. For example, the operation 814 can include grouping or clustering data points using a point clustering algorithm during processing of the input data. In various examples, the connectivity data can comprise a classification of multiple data points as an object and/or motion data associated with the object. The motion data can be used by a vehicle computing device to validate and/or control operation of a vehicle, such as an autonomous vehicle. For instance, the vehicle safety system can implement the machine learned model to estimate motion (e.g., velocity, acceleration, etc.) of an object based on the multi-channel image data 804. In one specific example, the multi-channel image data 804 representing multiple image frames at different times can be input into the machine learned model 812 to estimate or otherwise determine a velocity of an object and/or a velocity of a data point. Individual channels of the multi-channel image data can, for example, be associated with a different feature (e.g., intensity, azimuth, etc.).

In some examples, the velocity of an object and/or the velocity of a data point can represent an image space velocity and/or a three-dimensional velocity. For example, the motion data can represent a velocity of a pixel in image space. In such examples, the velocity of the pixel can be based at least in part on a change in position of the pixel over time relative to a coordinate system. In some examples, the velocity of an object and/or the velocity of a data point can include an x, y direction and/or an x, y, and z direction.

In various examples, the machine learned model can process two or more image frames (e.g., individual channels or multi-channel image data) associated with different times to determine an instantaneous velocity of an object. In some examples, the image frames may be associated with (or may be based on) lidar data captured by one or more lidar sensors. Each image frame may also be associated with two or more channels and each channel represents a different feature. In one specific example, the machine learned model 812 can include a single convolutional neural network layer to efficiently and accurately process the channels to output the conductivity data and motion data 816 for each image frame (e.g., cluster identifiers for each cluster). In such examples, heuristics can be applied to an output(s) of the machine learned model 812 to associate or identify clusters of different image frames that are similar.

In some examples, a channel of the first multi-channel image data represents at least one of: elevation data, azimuth angle data, two dimensional coordinate data, three dimensional coordinate data, intensity data, range data, an average elevation angle relative to the vehicle, a difference in a three dimensional Euclidean distance between a first lidar data point of the first multi-channel image data and a second lidar data point of the second multi-channel image data, a difference in a radial distance between the first lidar data point and the second lidar data point, a difference in intensity between the first lidar data point and the second lidar data point, a difference in azimuth angle between the first lidar data point and the second lidar data point relative to the vehicle, a difference in elevation between the first lidar data point and the second lidar data point relative to the vehicle, a heading of the first lidar data point or the second lidar data point, a curvature (e.g., a local curvature) associated with the first lidar data point and the second lidar data point, pulse information associated with a lidar sensor (e.g. a strongest pulse, a last pulse returned, etc.), or a planar angle of three or more lidar data points of the first multi-channel image data or the second multi-channel image data.

In some examples, the motion data output by the machine learned model 812 can be determined based on optical flow techniques. In some examples, the motion data can be determined based at least in part on a distance between lidar data points and/or clusters associated with different times. In one specific example, the motion data can be based at least in part on a difference in a centroid of the object from a first time to a second time after the first time. The motion data may also or instead be based at least in part on an iterative closest point technique applied to data points associated with the first multi-channel image data and the second multi-channel image data.

In various examples, a machine learned model can determine an object trajectory based at least in part on the connectivity data and the motion data. For instance, a same or different model can determine a trajectory for one or more objects based on an output from the machine learned model 812. In some examples, a model can determine a distance and/or a potential intersection between a planned trajectory for the vehicle and the object based at least in part on the object trajectory.

In some examples, an object velocity can be input into the machine learned model 812 for determining a change in object velocity over time. For example, the machine learned model 812 can determine an acceleration of one or more objects in an environment based at least in part on a change in data point locations associated with the first multi-channel image data and the second multi-channel image data (and/or based on third multi-channel image data).

An operation 818 can include receiving one or more confidence scores output from the machine learned model. In various examples, the machine learned model can output a score to indicate a confidence in the motion data (e.g., a level of confidence that the motion data is accurate). For example, the machine learned model can determine a confidence score indicating a level of accuracy of the motion data, and output the confidence score to another model or component of a vehicle computing device for use in planning operations (e.g., determining a planned trajectory for a vehicle) and/or perception operations (e.g., adjusting an amount or type of general information used as input for future determinations by the model).

In some examples, the machine learned model can output a channel confidence score to indicate a confidence in an amount that each feature (or channel) contributes to an object determination and/or a motion estimate. For example, the model can determine which channel of the multiple channel image data used as input affects the motion estimate based on a score assigned to each channel. In some examples, the channel confidence score of different channels can be compared one to another to identify which channel produces the most accurate motion data (e.g., velocity estimate) relative to another channel. In this way, the model can track the data point(s) associated with the most useful input features (e.g., the highest channel confidence scores can be used to determine future input data to the model).

In some examples, one or more of the confidence scores output by the model can be used to determine how input features (e.g., channels) affect an output from the model. For instance the confidence score associated with a channel can be used to trim the channel from being used as input data at a future time.

In some examples, the model can determine a confidence level in a direction associated with a data point. For example, the model can output a level of confidence that a lidar data point is associated with motion in an x, y, and/or z direction. In other words, in addition to determining motion data for a lidar point, the model can also output a probability that the lidar point follows the x, y, and/or z direction. In some examples, a confidence level can be determined for velocity in different x, y, and/or z directions.

In some examples, the model can output a cluster association score indicating an association or relationship between two clusters (e.g., of two different times). The cluster association score may indicate a level of association between a first cluster captured at a first time and a second cluster captured at a second time different from the first time. As mentioned above, the multichannel image data input into the model can represent various lidar data points at different times. The model can assign a cluster identifier to a cluster of points captured at a first time and use the cluster association score to assign a same cluster identification to a cluster of data points captured at a second time. In various examples, the cluster association score of different image frames can be compared to a score threshold and/or one to another to estimate a velocity.

Figure 9:
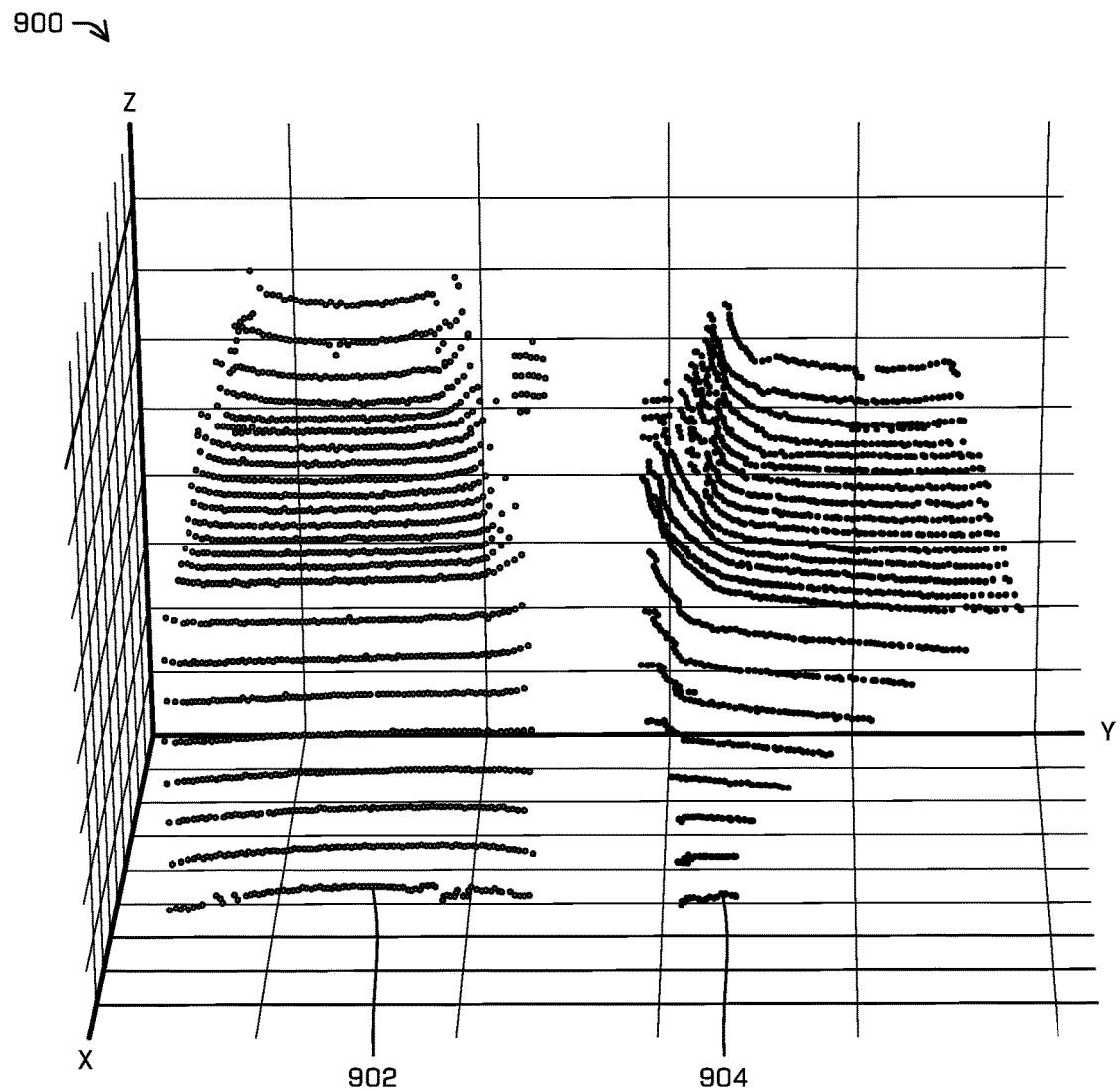
FIG. 9 is an illustration of example data representing input data or output data of an example model implementing the techniques described herein.

FIG. 9 is an illustration of example data 900 representing input data or output data of an example model implementing the techniques described herein. In some examples, the data 900 is associated with a machine learned model implemented by a vehicle safety system (e.g., the machine learned model 108 and/or the machine learned model 812) that determines connectivity data representing the environment.

As depicted in FIG. 9, the data 900 can comprise first data 902 that represents cluster data (e.g., 3D lidar data) for each channel of input data associated with a first time and second data 904 that represents cluster data for each channel of input data associated with a second time after the first time. Each channel of the first data 902 and the second data 904 can be based at least in part on range data, azimuth angle data, elevation data, and intensity data, just to name a few.

The first data 902 and the second data 904 can also represent output data from the machine learned model 812. For example, the first data 902 and the second data 904 can represent 3D lidar data associated with a cluster identifier to identify a single object over time. In some examples, the machine learned model 812 can determine the cluster identifier for associated with one or more data clusters associated with different times.

Figure 10:
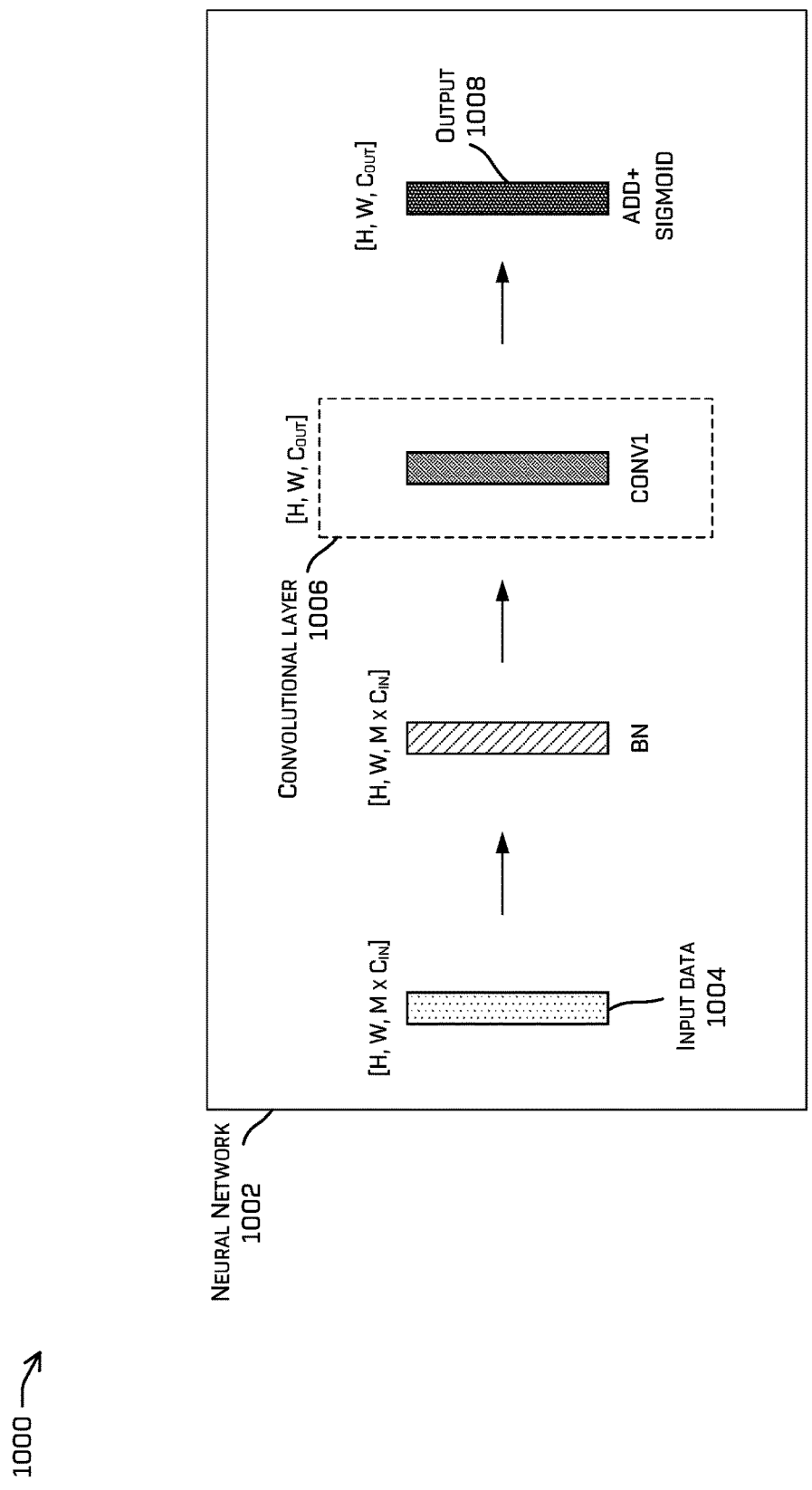
FIG. 10 is an illustration of an example machine learned model to determine connectivity data and motion data between data points in an environment.

FIG. 10 is an illustration of an example machine learned model to determine connectivity data and motion data between data points in an environment. For instance, a machine learned model of a vehicle safety system can implement a neural network 1002 that receives input data 1004 (e.g., the multi-channel image data), processes the input data 1004 through a single convolutional layer 1006, and determines an output 1008 indicating a cluster of data points representing object information and/or motion information associated with the object.

In various examples, a channel of the multi-channel image data representing the input data 1004 can comprise "pre-processed" sensor data indicating an object velocity, a yaw rate, and other attributes of an object and/or the vehicle.

In some examples, the single convolutional layer 1006 can comprise a kernel of one by one with a stride one. Accordingly, the neural network 1002 may be an interpretable or otherwise verifiable model.

As shown in FIG. 10, the input data 1004 and batch normalization can include parameters "[H, W, M×$C_{in}$]". Here, M×$C_{in}$ can represent M image frames and/or channels included in the input data 1004 where "M" is an integer greater than 1 (e.g., "M" can represent a number of channels included in multi-channel image data used as the input data 1004).

In some examples, a machine learned model can be trained based on training data that includes segmentation information and velocity data. The training data may include a wide variety of data, such as image data, video data, lidar data, radar data, audio data, other sensor data, etc., that is associated with a value (e.g., a desired classification, inference, prediction, etc.). Such values may generally be referred to as a "ground truth." To illustrate, the training data may be used for clustering data and determining motion data, as such, may include an image of an environment that is captured by an autonomous vehicle and that is associated with one or more classifications or determinations. During training, a loss function that takes into account a data point velocity or an object velocity can be used to improve velocity predictions by the model.

In some examples, a loss function usable to train the neural network 1002 can be based at least in part on an output of the neural network 1002. For instance, a different loss function can be used for training based on whether the output of the neural network 1002 includes a channel confidence score, a cluster associated score, motion data confidence score, and so on. In other words, one or more loss functions can be implemented based at least in part on which types of score(s) are included in the output 1008. By way of example and not limitation, when the output 1008 includes a probability score, a "logarithmic loss" (also referred to as "log loss") may be used for training while in other examples "hinge loss" or "binary cross entropy loss" can be implemented. In examples when the output 1008 includes a cluster association score, the loss function can include "mean average precision loss" and/or or pairwise distance metrics such as "cosine similarity", "Jaccard index", and the like. Of course, any of the loss functions/metrics described herein can be combined to train the neural network 1002.

Figure 11:
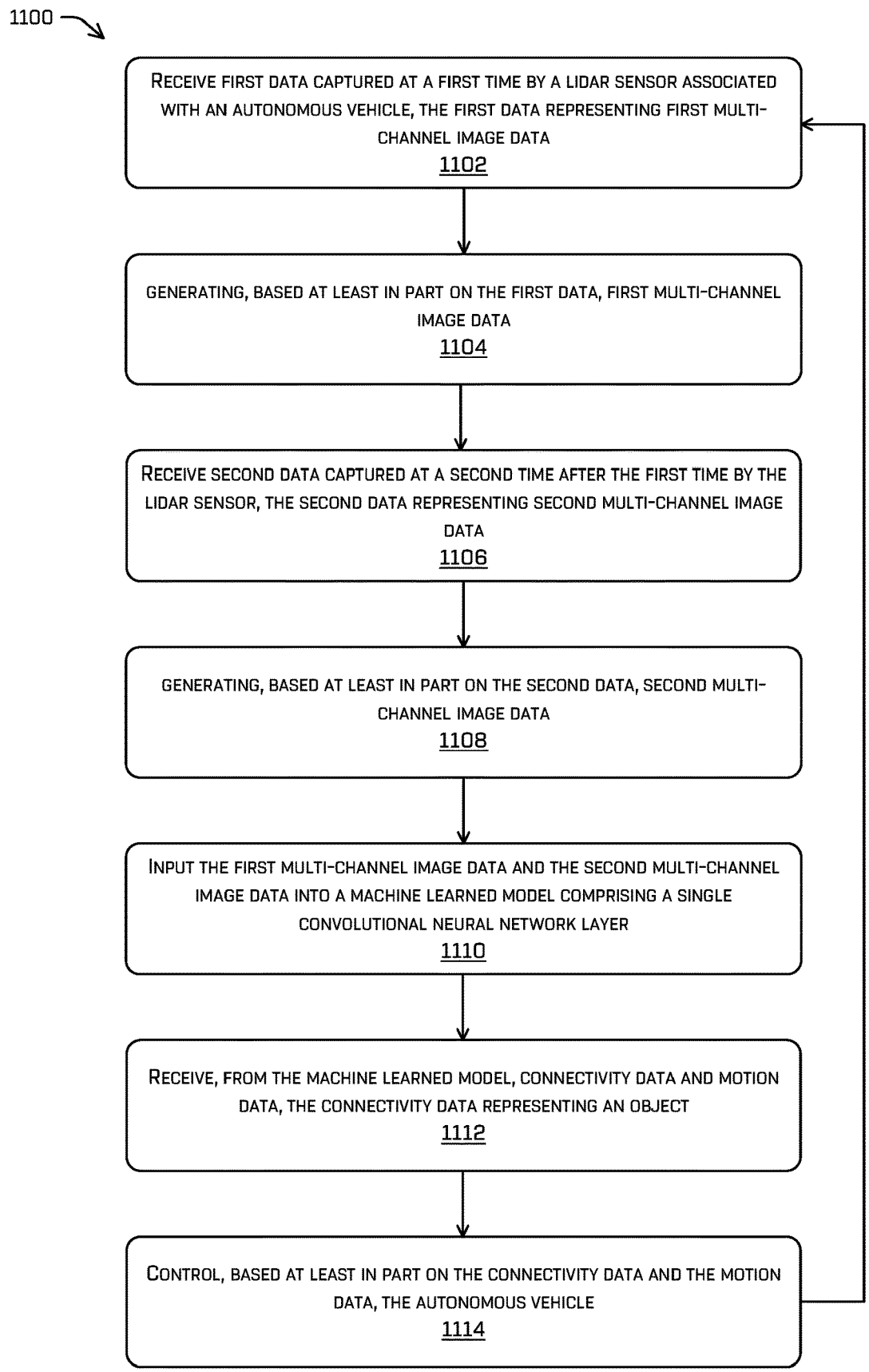
FIG. 11 is a flowchart depicting an example process for determining connectivity data using one or more example models.

FIG. 11 is a flowchart depicting an example process 1100 for determining connectivity data using one or more example models. For example, some or all of the process 1100 can be performed by one or more components in FIG. 6 and/or the neural network 1002, as described herein. For example, some or all of the process 1100 can be performed by a vehicle computing device, such as the first computing device(s) 604 and/or the second computing device(s) 618 of FIG. 6.

At operation 1102, the process may include receiving first data captured at a first time by a lidar sensor associated with an autonomous vehicle. In some examples, the operation 1102 may include a vehicle computing device capturing sensor data from a lidar sensor of the vehicle 602. In some examples, the sensor data comprises data points of the environment, such as lidar data points. The sensor data may be received from one or more sensors on the vehicle 602 and/or from one or more remote sensors.

At operation 1104, the process may include generating, based at least in part on the first data, first multi-channel image data. For instance, a component or machine learned model associated with the first computing device(s) 604 and/or the second computing device(s) 618 can process the first data to generate two more channels of image data in which each channel is associated with a different feature.

At operation 1106, the process may include receiving second data captured at a second time after the first time by the lidar sensor. In some examples, the operation 1106 may include the vehicle computing device receiving additional sensor data, and determining the second multi-channel image data based at least in part on the additional sensor data.

At operation 1108, the process may include generating, based at least in part on the second data, second multi-channel image data. For instance, a component or machine learned model associated with the first computing device(s) 604 and/or the second computing device(s) 618 can process the second data to generate two more channels of image data in which each channel is associated with a different feature.

At operation 1110, the process may include inputting the first multi-channel image data and the second multi-channel image data (e.g., the input data 804) into a machine learned model (e.g., the machine learned model 812) comprising a single convolutional neural network layer. In some examples, the operation 1110 may include inputting a stack of image frames in which each image frame is associated with multiple image channels. Each of the image channels can be associated with different feature data (e.g., azimuth data, intensity data, coordinate data in x, y, and/or z space, etc.).

At operation 1112, the process may include receiving, from the machine learned model, connectivity data and motion data, the connectivity data representing an object. In some examples, the operation 1112 may include the machine learned model applying one or more algorithms (e.g., the neural network 1002) to cluster data points associated with the first multi-channel image data and cluster data points associated with the second multi-channel image data. In some examples, the clustered data points can represent an object. In various examples, a change in position between a first data point of a first data cluster associated with the first multi-channel image data and a second data point of a second data cluster associated with the second multi-channel image can be used to determine a velocity of a data point (e.g., a lidar data point) and/or of an object over time. Thus, the motion data can represent an instantaneous velocity of a data point and/or an object based at least in part on movement of a lidar point over time.

At operation 1114, the process may include controlling, based at least in part on the connectivity data and the motion data, the autonomous vehicle. For example, connectivity data and motion data output by the machine learned model 812 may be sent to a vehicle computing device that can detect an object and use the connectivity data and the motion data to control an action of the vehicle 602, such as determining a trajectory for the vehicle or otherwise causing the vehicle to traverse the environment. For instance, controlling the vehicle may comprise stopping the vehicle and/or controlling at least one of: a braking system, an acceleration system, or a drive system of the vehicle.

FIGS. 1, 7, and 11 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

A: A system comprising: one or more processors; and one or more non-transitory computer-readable media storing instructions executable by the one or more processors, wherein the instructions, when executed, cause the system to perform operations comprising: receiving lidar data points captured by a lidar sensor associated with an autonomous vehicle; associating the lidar data points with a two-dimensional data representation comprising input data, the input data including elevation data and azimuth angle data; inputting the two-dimensional data representation into a model; receiving, from the model, connectivity data representing a connection between two or more features of the two-dimensional data; clustering, based at least in part on the connectivity data, the two or more features of the two-dimensional data; and identifying, based at least in part on the clustering, object data representing an object in the two-dimensional data representation; controlling, based at least in part on the object data, the autonomous vehicle.

B: A system as paragraph A describes, wherein: the connectivity data comprises a classification probability indicating a likelihood of the connection between a first data point of the two-dimensional data representation relative to a second data point of the two-dimensional data representation, and the operations further comprising: comparing the classification probability to a threshold; and one of: determining that the first data point and the second data point are connected based at least in part on the classification probability meeting or exceeding the threshold; or determining that the first data point and the second data point are not connected based at least in part on the classification probability being below the threshold.

C: A system as paragraphs A or B describe, the operations further comprising: comparing, as a distance comparison, the distance to a distance threshold; and comparing, as a direction comparison, the direction to a direction threshold; wherein the clustering is further based at least in part on the distance comparison and the direction comparison.

D: A system as paragraphs A-C describe, wherein: the model comprises a single convolutional neural network layer; and the object data indicates an edge of the object or semantic information associated with the object.

E: A system as paragraphs A-D describe, wherein the model is a first model, wherein the input data further comprises one or more of: coordinate data, intensity data, range data, an average elevation angle relative to the autonomous vehicle, a difference in a three dimensional Euclidean distance between two of the lidar data points, a difference in a radial distance between two of the lidar data points, a difference in intensity between two of the lidar data points, a difference in azimuth angle between two of the lidar data points relative to the autonomous vehicle, a difference in elevation between two of the lidar data points relative to the autonomous vehicle, a heading of two neighboring points of the lidar data points, or a planar angle of three or more of the lidar data points.

F: A method comprising: receiving sensor data captured by a sensor associated with a vehicle; associating the sensor data with a two-dimensional data representation; inputting the two-dimensional data representation into a model; receiving, from the model, connectivity data representing a connection between two or more features of the two-dimensional data representation; clustering, based at least in part on the connectivity data, features of the two-dimensional data representation; and identifying, based at least in part on the clustering, object data representing an object in the two-dimensional data representation; controlling, based at least in part on the object data, the vehicle.

G: A method as paragraph F describes, wherein the sensor data comprises lidar data, and the method further comprises: associating the two-dimensional data representation with input data, the input data including elevation data and azimuth angle data; and inputting the input data into the model; wherein the model determines the connectivity data based at least in part on the input data.

H: A method as paragraphs F or G describe, wherein: the two or more features of the two-dimensional data representation comprise two or more points; and the input data further comprises one or more of: coordinate data, range data, intensity data, polar coordinates for the two or more points of the lidar data, Euclidian coordinates for the two or more points of the lidar data, Cartesian coordinates for the two or more points of the lidar data, an average elevation angle relative to the vehicle, a difference in a three-dimensional Euclidean distance between two or more data points of the lidar data, a difference in a radial distance between the two or more data points of the lidar data, a difference in intensity between a first data point and a second data point of the lidar data, a difference in azimuth angle between the first data point and the second data point relative to the vehicle, a difference in elevation between the first data point and the second data point relative to the vehicle, a heading of two neighboring data points of the lidar data, or a planar angle of three or more data points of the lidar data.

I: A method as paragraphs F-H describe, wherein: the connectivity data comprises a classification probability indicating a likelihood of the connection between a first data point of the two-dimensional data representation relative to a second data point of the two-dimensional data representation, and the method further comprises: comparing the classification probability to a threshold; and one of: determining that the first data point and the second data point are connected based at least in part on the classification probability meeting or exceeding the threshold; or determining that the first data point and the second data point are not connected based at least in part on the classification probability being below the threshold.

J: A method as paragraphs F-I describe, wherein the sensor data comprises one or more of lidar data, radar data, image data, depth data, or time of flight data.

K: A method as paragraphs F-J describe, wherein the two or more features of the two-dimensional data representation comprise two or more points, the connectivity data comprises a probability of the connection between the two or more points of the two-dimensional data representation, and the method further comprises: determining that the probability of the connection between the two or more points meets or exceeds a connection threshold; wherein the clustering is based at least in part on the probability meeting or exceeding the connection threshold.

L: A method as paragraphs F-K describe, wherein the model comprises a single convolutional neural network layer.

M: A method as paragraphs F-L describe, wherein the object data indicates an edge of the object or semantic information associated with the object.

N: A method as paragraphs F-M describe, wherein the model comprises a neural network layer comprising a first branch and a second branch, the first branch and the second branch operating in parallel, and the method further comprises: associating a first branch of the neural network layer with a first downsampling rate; and associating a second branch of the neural network layer with a second downsampling rate different from the first downsampling rate; wherein the model determines the connectivity data based at least in part on the neural network layer.

O: A method as paragraphs F-N describe, wherein the object data comprises edge information defining one or more edges of the object, and further comprising: determining, based at least in part on the edge information, a likelihood that the object and the vehicle intersect; and determining, based at least in part on the likelihood, an action for the vehicle.

P: A method as paragraphs F-O describe, further comprising: receiving a planned trajectory for the vehicle; determining, based at least in part on the connectivity data from the model, an object type, an object shape, or an object presence associated with the object; and verifying, based at least in part on the object type, the object shape, or the object presence, a potential intersection between the planned trajectory for the vehicle and the object.

Q: One or more non-transitory computer-readable media storing instructions executable by one or more processors, wherein the instructions, when executed, cause the one or more processors to perform operations comprising: receiving sensor data captured by a sensor associated with a vehicle; associating the sensor data with a two-dimensional data representation; inputting the two-dimensional data representation into a model; receiving, from the model, connectivity data representing a connection between two or more features of the two-dimensional data representation; clustering, based at least in part on the connectivity data, features of the two-dimensional data representation; identifying, based at least in part on the clustering, object data representing an object in the two-dimensional data representation; and controlling, based at least in part on the object data, the vehicle.

R: One or more non-transitory computer-readable media as paragraph Q describes, wherein the sensor data comprises lidar data, and the operations further comprise: associating the two-dimensional data representation with input data, the input data including elevation data and azimuth angle data; and inputting the input data into the model; wherein the model determines the connectivity data based at least in part on the input data.

S: One or more non-transitory computer-readable media as paragraphs Q or R describe, wherein: the connectivity data comprises a classification probability indicating a likelihood of the connection between a first data point of the two-dimensional data representation relative to a second data point of the two-dimensional data representation, and the operations further comprising: comparing the classification probability to a threshold; and one of determining that the first data point and the second data point are connected based at least in part on the classification probability meeting or exceeding the threshold; or determining that the first data point and the second data point are not connected based at least in part on the classification probability being below the threshold.

T: One or more non-transitory computer-readable media as paragraphs Q-S describe, wherein the two or more features of the two-dimensional data representation comprise two or more points, and the operations further comprise: determining a probability of the connection between the two or more points of the two-dimensional data representation; and determining that the probability of the connection between the two or more points meets or exceeds a connection threshold; wherein the model determines the connectivity data based at least in part on the probability meeting or exceeding the connection threshold.

U: A system comprising: one or more processors; and one or more non-transitory computer-readable media storing instructions executable by the one or more processors, wherein the instructions, when executed, cause the system to perform operations comprising: receiving first data captured at a first time by a lidar sensor associated with an autonomous vehicle; generating, based at least in part on the first data, first multi-channel image data; receiving second data captured at a second time after the first time by the lidar sensor; generating, based at least in part on the second data, second multi-channel image data; inputting the first multi-channel image data and the second multi-channel image data into a machine learned model comprising a single convolutional neural network layer; receiving, from the machine learned model, connectivity data and motion data, the connectivity data representing an object; and controlling, based at least in part on the connectivity data and the motion data, the autonomous vehicle.

V: The system of paragraph U, wherein: the motion data comprises at least one of: a first velocity of a lidar data point associated with the second multi-channel image data, or a second velocity associated with the object, the first velocity or the second velocity representing an image space velocity or a three-dimensional velocity.

W: The system of either paragraph U or V, the operations further comprising: determining a confidence score associated with the motion data, wherein controlling the autonomous vehicle is based at least in part on the confidence score.

X: The system of any one of paragraphs U-W, wherein the motion data comprises a cluster association score representing a probability that a first cluster represented in the first data is a second object represented in the second data; and based at least in part on the cluster association score, at least one of: determining to track motion of a data point of a second lidar data cluster at a third time; or classifying an object type for the object.

Y: The system of any one of paragraphs U-X, the operations further comprising: training the machine learned model based at least in part on segmentation information and velocity data.

Z: A method comprising: receiving first multi-channel image data based at least in part on first data captured at a first time by a first sensor associated with a vehicle; receiving second multi-channel image data based at least in part on second data captured at a second time after the first time by the first sensor; inputting the first multi-channel image data and the second multi-channel image data into a machine learned model; receiving, from the machine learned model, connectivity data and motion data, the connectivity data representing an object; and controlling, based at least in part on the connectivity data and the motion data, the vehicle.

AA: The method of paragraph Z, wherein: the machine learned model comprises a single convolutional neural network layer, and the first data or the second data comprises one or more of lidar data, radar data, image data, depth data, or time of flight data.

AB: The method of either paragraph Z or AA, wherein: the motion data comprises at least one of: a first velocity of a lidar data point associated with the second multi-channel image data, or a second velocity associated with the object.

AC: The method of any one of paragraphs Z-AB, further comprising: determining a confidence score associated with the motion data, wherein controlling the vehicle is based at least in part on the confidence score.

AD: The method of any one of paragraphs Z-AC, wherein the motion data comprises a cluster association score representing a probability that a first cluster represented in the first data is a second object represented in the second data; and based at least in part on the cluster association score, at least one of: determining to track motion of a data point of a second data cluster at a third time; or classifying an object type for the object.

AE: The method of any one of paragraphs Z-AD, training the machine learned model based at least in part on segmentation information and velocity data.

AF: The method of any one of paragraphs Z-AE, wherein each channel of the first multi-channel image data represents a different feature, and further comprising: determining a score for a feature associated with a channel of the first multi-channel image data, the score indicating a level of accuracy of the feature determining the motion data; and determining input data for the machine learned model at a third time based at least in part on the score.

AG: The method of any one of paragraphs Z-AF, wherein: the motion data is based on an optical flow technique, an iterative closest point technique, a distance between a first data point or a first cluster associated with the first multi-channel image data and a second data point associated with the second multi-channel image data, or a difference in a centroid of the object from the first time to the second time.

AH: The method of any one of paragraphs Z-AG, wherein a channel of the first multi-channel image data represents at least one of elevation data, azimuth angle data, two dimensional coordinate data, three dimensional coordinate data, intensity data, range data, an average elevation angle relative to the vehicle, a difference in a three dimensional Euclidean distance between a first lidar data point of the first multi-channel image data and a second lidar data point of the second multi-channel image data, a difference in a radial distance between the first lidar data point and the second lidar data point, a difference in intensity between the first lidar data point and the second lidar data point, a difference in azimuth angle between the first lidar data point and the second lidar data point relative to the vehicle, a difference in elevation between the first lidar data point and the second lidar data point relative to the vehicle, a heading of the first lidar data point or the second lidar data point, a curvature associated with the first lidar data point and the second lidar data point, pulse information associated with a lidar sensor, or a planar angle of three or more lidar data points of the first multi-channel image data or the second multi-channel image data.

AI: The method of any one of paragraphs Z-AH, further comprising: determining, based at least in part on the connectivity data and the motion data, an object trajectory.

AJ: The method of paragraph AI, further comprising: determining, based at least in part on the object trajectory, a distance between a planned trajectory for the vehicle and the object.

AK: One or more non transitory computer readable media storing instructions executable by one or more processors, wherein the instructions, when executed, cause the one or more processors to perform operations comprising: receiving first multi-channel image data based at least in part on first data captured at a first time by a first sensor associated with a vehicle; receiving second multi-channel image data based at least in part on second data captured at a second time after the first time by the first sensor; inputting the first multi-channel image data and the second multi-channel image data into a machine learned model; receiving, from the machine learned model, connectivity data and motion data, the connectivity data representing an object; and controlling, based at least in part on the connectivity data and the motion data, the vehicle.

AL: The one or more non transitory computer readable media of paragraph AK, wherein: the machine learned model comprises a single convolutional neural network layer, and the first data or the second data comprises one or more of: lidar data, radar data, image data, depth data, or time of flight data.

AM: The one or more non transitory computer readable media of either paragraph AK or AL, further comprising: determining a confidence score associated with the motion data, wherein controlling the vehicle is based at least in part on the confidence score.

AN: The one or more non transitory computer readable media of any one of paragraphs AK-AM, wherein the motion data comprises a cluster association score representing a probability that a first cluster represented in the first data is a second object represented in the second data; and based at least in part on the cluster association score, at least one of: determining to track motion of a data point of a second data cluster at a third time; or classifying an object type for the object.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
   receiving first data captured at a first time by a lidar sensor associated with an autonomous vehicle;
   generating, based at least in part on the first data, first multi-channel image data;
   receiving second data captured at a second time after the first time by the lidar sensor;
   generating, based at least in part on the second data, second multi-channel image data;
   inputting the first multi-channel image data and the second multi-channel image data into a first machine learned model comprising a single convolutional neural network layer;
   receiving, from the first machine learned model, connectivity data and motion data, the connectivity data comprising a classification probability indicating a connection between a first data point of the first multi-channel image data and a second data point of the second multi-channel image data, wherein the connection between the first data point of the first multi-channel image data and the second data point of the second multi-channel image data is based at least in part on the classification probability meeting or exceeding a threshold;
   inputting the connectivity data into a second machine-learned model associated with a clustering algorithm;
   determining, based at least in part on an output of the second machine-learned model, that the first data point and the second data point are associated with a same object or different objects; and
   controlling, based at least in part on the output of the second machine-learned model, the autonomous vehicle.

2. The system of claim 1, wherein:
the motion data comprises at least one of: a first velocity of a lidar data point associated with the second multi-channel image data, or a second velocity associated with an object, the first velocity or the second velocity representing an image space velocity or a three-dimensional velocity.

3. The system of claim 1, the operations further comprising:
determining a confidence score associated with the motion data,
wherein controlling the autonomous vehicle is based at least in part on the confidence score.

4. The system of claim 1, wherein the motion data comprises a cluster association score representing a probability that a first cluster represented in the first data is a second object represented in the second data; and
based at least in part on the cluster association score, at least one of:
determining to track motion of a data point of a second lidar data cluster at a third time; or
classifying an object type for an object.

5. A method comprising:
receiving first multi-channel image data based at least in part on first data captured at a first time by a first sensor associated with a vehicle;
receiving second multi-channel image data based at least in part on second data captured at a second time after the first time by the first sensor;
inputting the first multi-channel image data and the second multi-channel image data into a first machine learned model;
receiving, from the first machine learned model, connectivity data and motion data, the connectivity data comprising a classification probability indicating at least a connection between a first data point of the first multi-channel image data and a second data point of the second multi-channel image data, wherein the connection between the first data point of the first multi-channel image data and the second data point of the second multi-channel image data is based at least in part on the classification probability meeting or exceeding a threshold;
inputting the connectivity data into a second machine-learned model associated with a clustering algorithm;
determining, based at least in part on an output of the second machine-learned model, that the first data point and the second data point are associated with a same object or different objects; and
controlling, based at least in part on the output of the second machine-learned model and the motion data, the vehicle.

6. The method of claim 5, wherein:
the first machine learned model comprises a single convolutional neural network layer, and
the first data or the second data comprises one or more of: lidar data, radar data, image data, depth data, or time of flight data.

7. The method of claim 5, wherein:
the motion data comprises at least one of: a first velocity of a lidar data point associated with the second multi-channel image data, or a second velocity associated with an object.

8. The method of claim 5, wherein the motion data comprises a cluster association score representing a probability that a first cluster represented in the first data is an object represented in the second data; and
based at least in part on the cluster association score, at least one of:
determining to track motion of a data point of a second data cluster at a third time; or
classifying an object type for the object.

9. The method of claim 5, wherein each channel of the first multi-channel image data represents a different feature, and further comprising:
determining a score for a feature associated with a channel of the first multi-channel image data, the score indicating a level of accuracy of the feature determining the motion data; and
determining input data for the first machine learned model at a third time based at least in part on the score.

10. The method of claim 5, wherein:
the motion data is based on an optical flow technique, an iterative closest point technique, a distance between the first data point or a first cluster associated with the first multi-channel image data and the second data point associated with the second multi-channel image data, or a difference in a centroid of an object from the first time to the second time.

11. The method of claim 5, wherein a channel of the first multi-channel image data represents at least one of: elevation data, azimuth angle data, two dimensional coordinate data, three dimensional coordinate data, intensity data, range data, an average elevation angle relative to the vehicle, a difference in a three dimensional Euclidean distance between a first lidar data point of the first multi-channel image data and a second lidar data point of the second multi-channel image data, a difference in a radial distance between the first lidar data point and the second lidar data point, a difference in intensity between the first lidar data point and the second lidar data point, a difference in azimuth angle between the first lidar data point and the second lidar data point relative to the vehicle, a difference in elevation between the first lidar data point and the second lidar data point relative to the vehicle, a heading of the first lidar data point or the second lidar data point, a curvature associated with the first lidar data point and the second lidar data point, pulse information associated with a lidar sensor, or a planar angle of three or more lidar data points of the first multi-channel image data or the second multi-channel image data.

12. The method of claim 5, further comprising:
determining, based at least in part on the connectivity data and the motion data, an object trajectory.

13. The method of claim 12, further comprising:
determining, based at least in part on the object trajectory, a distance between a planned trajectory for the vehicle and an object.

14. One or more non-transitory computer-readable media storing instructions executable by one or more processors, wherein the instructions, when executed, cause the one or more processors to perform operations comprising:
receiving first multi-channel image data based at least in part on first data captured at a first time by a first sensor associated with a vehicle;
receiving second multi-channel image data based at least in part on second data captured at a second time after the first time by the first sensor;
inputting the first multi-channel image data and the second multi-channel image data into a first machine learned model;
receiving, from the first machine learned model, connectivity data and motion data, the connectivity data comprising a classification probability indicating at least a connection between a first data point of the first multi-channel image data and a second data point of the second multi-channel image data, wherein the connection between the first data point and the second data point is based at least in part on the classification probability exceeding a threshold;

inputting the connectivity data into a second machine-learned model associated with a clustering algorithm;

determining, based at least in part on an output of the second machine-learned model, that the first data point of the connectivity data and the second data point of the connectivity data are associated with a same object or different objects; and controlling, based at least in part on the output of the second machine-learned model, the vehicle.

15. The one or more non-transitory computer-readable media of claim 14, wherein:

the first machine learned model comprises a single convolutional neural network layer, and the first data or the second data comprises one or more of: lidar data, radar data, image data, depth data, or time of flight data.

16. The one or more non-transitory computer-readable media of claim 14, further comprising:

determining a confidence score associated with the motion data, wherein controlling the vehicle is based at least in part on the confidence score.

17. The one or more non-transitory computer-readable media of claim 14, wherein the motion data comprises a cluster association score representing a probability that a first cluster represented in the first data is an object represented in the second data; and based at least in part on the cluster association score, at least one of:

determining to track motion of a data point of a second data cluster at a third time; or classifying an object type for the object.

18. The system of claim 1, wherein the second machine-learned model is trained to implement a segmentation technique, the operations further comprising:

receiving, from the second machine-learned model, an output generated by the segmentation technique, indicating at least an association between a first set of data points of the connectivity data and an object.

19. The system of claim 1, wherein the first machine learned model is trained using a loss function configured to measure a difference between predicted connectivity data and ground truth data.

20. The system of claim 1, wherein the first machine learned model is configured to assign a score to individual channels of the first multi-channel image data and the second multi-channel image data, the score indicating a degree to which an individual channel contributes to determining the motion data relative to other channels.

* * * * *